United States Patent
Sarkar et al.

(10) Patent No.: US 9,253,704 B1
(45) Date of Patent: Feb. 2, 2016

(54) INTELLIGENCE IN HANDOVER ASSESSMENT FOR LTE/VOLTE CALLS TO IMPROVE RETAINABILITY

(71) Applicant: Telefonaktiebolaget L M Ericsson (publ), Stockholm (SE)

(72) Inventors: Debasish Sarkar, Irvine, CA (US); Ayan Sen, Gurgaon (IN); Jaspal Singh, Gurgaon (IN); Narendra Kumar Singh, Delhi (IN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/496,422

(22) Filed: Sep. 25, 2014

(51) Int. Cl.
    *H04W 36/26*    (2009.01)
    *H04W 36/30*    (2009.01)

(52) U.S. Cl.
    CPC .................................. *H04W 36/30* (2013.01)

(58) Field of Classification Search
    CPC ..... H04W 36/16; H04W 36/24; H04W 36/26; H04W 36/30; H04W 36/38
    USPC .................................. 455/436, 437; 370/331
    See application file for complete search history.

(56) References Cited

U.S. PATENT DOCUMENTS

| | | | | |
|---|---|---|---|---|
| 2007/0213060 A1* | 9/2007 | Shaheen | ............... | H04W 36/10 455/436 |
| 2014/0016614 A1* | 1/2014 | Velev | .................... | H04W 4/005 370/331 |
| 2014/0187245 A1* | 7/2014 | Xu | .................... | H04W 36/0016 455/436 |
| 2014/0321430 A1* | 10/2014 | Bakker | ............. | H04W 36/0033 370/331 |
| 2015/0141021 A1* | 5/2015 | Kapoulas | ............... | H04W 36/32 455/441 |

* cited by examiner

*Primary Examiner* — Christopher M Brandt

(57) ABSTRACT

A system and method to sustain an on-going voice call or other service during a handover, HO, by preventing the handover to a target cell that fails to admit all the mandatory Radio Access Bearers, RABs, as part of supporting one or more Quality of Service Class Identifiers, QCIs, associated with the ongoing service. When the source evolved Node B, eNB, prevents the HO to the best target cell, it may attempt the HO to the next best target cell. If the next best cell fails to admit all the mandatory RABs and if there are no other intra-LTE or inter-LTE cells available for HO, the source eNB may perform an inter-Radio Access Technology, RAT, HO using the Single Radio Voice Call Continuity, SRVCC, procedure. By preventing "partial" handovers, the retainability of an ongoing service is significantly improved. The target cells causing failure of particular RABs can be tracked using new counters.

22 Claims, 9 Drawing Sheets

| QCI | Type | Priority | Example Services |
|---|---|---|---|
| 1 | GBR | 2 | Conversational Voice |
| 2 | | 4 | Conversational Video (Live Streaming) |
| 3 | | 3 | Real Time Gaming |
| 4 | | 5 | Non-Conversational Video (Buffered Streaming) |
| 5 | Non-GBR | 1 | IMS Signaling |
| 6 | | 6 | Video (Buffered Streaming) TCP-based |
| 7 | | 7 | Voice, Video (Live Streaming), Interactive Gaming |
| 8 | | 8 | Video (Buffered Streaming) TCP-based |
| 9 | | 9 | |

INTELLIGENCE IN HANDOVER ASSESSMENT FOR LTE/VOLTE CALLS TO IMPROVE RETAINABILITY

TECHNICAL FIELD

The present disclosure generally relates to the handover procedure in a wireless communication system. More particularly, and not by way of limitation, particular embodiments of the present disclosure are directed to a system and method in which the handover of a User Equipment (UE) from a source cell to a target cell in a wireless network is performed only when the target cell confirms admission of all mandatory Radio Access Bearers (RABs) needed to support one or more Quality of Service Class Identifiers (QCIs) associated with a service being provided to the UE through the source cell.

BACKGROUND

In cellular communication, the most basic form of "handover" or "handoff" is when a phone call in progress is redirected from its current cell, which is called a "source cell" or "serving cell", to a new cell (called "target cell"). In terrestrial cellular radio networks, the source and the target cells may be served from two different cell sites or from a single cell site. In the latter case, the two cells are usually referred to as two "sectors" on the cell site. Such a handover (HO), in which the source and the target cells are different cells—even if they are on the same cell site—is called an inter-cell handover. The purpose of an inter-cell handover is to maintain the call as the subscriber is moving out of the area covered by the source cell and entering the area of the target cell.

FIG. 1 illustrates certain network interfaces—i.e., the "S1," "X2", and "Uu" interfaces—in a Third Generation Partnership Project's (3GPP) Long Term Evolution (LTE) network 15. These network interfaces may be relevant during a handover. The LTE network 15 is shown to include a source cell 17 having a source/serving evolved Node B (eNB or eNodeB) or Radio Base Station (RBS, or more simply "BS") 18 associated therewith, and a target cell 20 having a target eNB or BS 21 associated therewith. For the sake of simplicity, only two cells—the serving cell 17 and the target cell 20—are shown in FIG. 1 as part of the network 15. It is understood that many such cells may form part of the network 15, and inter-cell handovers among those cells allow a UE, for example, the UE 23, to "seamlessly" continue mobile communication throughout the network 15 and beyond. As mentioned earlier, the cells 17 and 20 may be part of different cell sites (not shown) or may belong to the same cell site (not shown). Furthermore, although cells 17 and 20 are illustrated far apart in FIG. 1 and although UE 23 is shown outside of both of these cells 17, 20, such illustration is for the sake of convenience and ease of discussion only. In the context of the handover related discussion with reference to FIG. 1, it is understood that the UE 23 may be physically present and operating (or registered) within the serving cell 17 or may be currently associated with—i.e., under Radio Frequency (RF) coverage of—or attached to the serving cell 17 in some manner such as, for example, through a prior handover. The UE 23 may now need to be handed over to the target cell 20 if so determined by the serving eNB 18 associated with the source cell 17 and providing RF coverage to the UE 23 within the source cell 17. The target eNB 21 may provide RF coverage over cell 20 and in its vicinity.

In LTE, the communication interface between the serving eNB 18 and the target eNB 21 is called the "X2" interface, which may be used to carry out necessary HO-related signaling. The X2 communication interface between two eNBs 18, 21 is symbolically illustrated by line 25. The radio interface between the UE 23 and an eNodeB is called the "Uu" interface in LTE. The "Uu" interfaces to source and target eNBs are symbolically illustrated by radio links 27-28 in FIG. 1.

As shown in FIG. 1, the LTE network 15 may also include a Core Network (CN) 30, which may be an Evolved Packet Core (EPC). In FIG. 1, the block showing the CN 30 is shown dotted to indicate lack of any appreciable involvement of many of its component nodes during a handover operation. However, a management node 32 in the CN 30 may be needed to facilitate handover. In the EPC, the management node 32 may include the functionalities of a Mobility Management Entity (MME) and a Serving Gateway (S-GW). For ease of discussion, the MME and S-GW are not illustrated separately in FIG. 1. However, it is understood that the MME and the S-GW may be separately implemented in the CN 30. As noted earlier, the eNBs 18, 21 may be interconnected with each other by means of the X2 interface. Furthermore, the eNBs 18, 21 also may be connected to the CN 30 such as, for example, the EPC in LTE, by means of the "S1" interface as symbolically illustrated by lines 34-35 in FIG. 1. More specifically, the S1 interface may include two separate interfaces—the interface "S1-MME" connecting an eNB to the MME in the CN 30, and the interface "S1-U" connecting an eNB to the S-GW in the CN 30. It is noted here that the S1 interface supports a many-to-many relation between MMEs/S-GWs and eNBs.

X2 and S1 Handovers

FIG. 2 shows an operational sequence 38 for X2 handover in an LTE network, whereas FIG. 3 (discussed later below) shows an operational sequence 54 for S1 handover in an LTE network. The LTE network may be the network 15 in FIG. 1. The term "X2 handover" may refer to the handover related messaging across the X2 interface connecting the source and the target eNBs 18 and 21, respectively. On the other hand, the term "S1 handover" may refer to the handover related messaging across the respective S1 interfaces 34, 35 for the source and target eNBs 18, 21. A detailed description of various messages shown in the operational sequences 38, 54 in FIGS. 2 and 3, respectively, may be obtained from a number of 3GPP Technical Specifications (TS) such as, for example, the 3GPP TS 36.133, version 12.3.0 (March 2014), titled "$3^{rd}$ Generation Partnership Project; Technical Specification Group Radio Access Network; Evolved Universal Terrestrial Radio Access (E-UTRA); Requirements for support of radio resource management (Release 12)"; the 3GPP TS 36.331, version 12.2.0 (June 2014), titled "$3^{rd}$ Generation Partnership Project; Technical Specification Group Radio Access Network; Evolved Universal Terrestrial Radio Access (E-UTRA); Radio Resource Control (RRC); Protocol specification (Release 12)"; the 3GPP TS 36.413, version 12.2.0 (June 2014), titled "$3^{rd}$ Generation Partnership Project; Technical Specification Group Radio Access Network; Evolved Universal Terrestrial Radio Access Network (E-UTRAN); S1 Application Protocol (S1AP) (Release 12)"; and the 3GPP TS 36.423, version 12.2.0 (June 2014), titled "$3^{rd}$ Generation Partnership Project; Technical Specification Group Radio Access Network; Evolved Universal Terrestrial Radio Access Network (E-UTRAN); X2 application protocol (X2AP) (Release 12)." The relevant portions of these 3GPP TSs are incorporated herein by reference in their entireties. Because of significant details of the HO operation in these 3GPP TSs, only a brief discussion of the operational sequences in FIGS. 2 and 3 is provided below.

It is noted here that the messaging in FIGS. 2-3 is shown in the context of the network configuration in FIG. 1. Hence, the same reference numerals are used in these figures to refer to the same/similar entities. Furthermore, for ease of discussion, the management node 32 is depicted using two separate entities 32a, 32b in FIG. 2, and four separate entities 32a-32d in FIG. 3. However, these separate entities may be implemented using a single node or multiple nodes in the CN 30. Also, in one embodiment, in the context of FIG. 3, the target MME 32d and the target S-GW 32c may be part of a core network (not shown) that is different from the CN 30.

In the discussion below, a "cell" and its associated eNB may be referred to in an interchangeable manner. For example, a UE may be interchangeably referred to as being handed over to a target cell or a target eNB, or an HO may be interchangeably referred to as being initiated by a source cell or a source eNB, and so on.

Referring now to FIG. 2, in the RRC_Connected state—which is symbolically illustrated using the reference numeral "40"—the source eNB 18 may send, at arrow 42, an "RRC Connection Reconfiguration" message to the UE 23 containing information about Signaling Radio Bearers (SRBs) that are setup by the source eNB 18 for RRC messages and about the neighbor cell measurement configuration that the UE 23 should use to perform measurements on the neighboring cells and to report the measurements to the source eNB 18. The SRBs are typically defined as Radio Bearers (RBs), which are discussed in more detail later with reference to FIG. 4. An HO is a procedure that changes the serving cell of a UE in RRC_Connected state. As is known, when the UE 23 is mobile, it may start receiving RF signals from the eNB 21 in the target cell 20 along with the RF signals from its serving cell 17, especially when the UE 23 is in the vicinity of the target cell 20. The source eNB 18 may thus instruct the UE 23 attached to the serving cell 17 and under operative control of the eNB 18 to perform certain measurements on the target cell 20. The eNB 18 may use different policies for instructing the UE 23 to do the measurements and when to report them to the eNB 18. In FIG. 2, the dotted arrow 43 shows a data plane that has been established between the UE 23 and the S-GW 32a in the CN 30 to continue supporting UE's data transfers while the HO-related RRC messaging occurs among the UE 23, the source eNB 18, and the target eNB 21. The data transfers may be associated with a service that is currently being received by the UE 23 through the source cell 17. The service may be, for example, a voice call, a multimedia content download, online messaging, and the like.

When the UE 23 receives RF signals from the target cell 20, the UE 23 may report target cell's signals measurements, as received by the UE 23, to its serving cell 17 using an "RRC Measurement Report" at arrow 44. The UE's Measurement Report may identify a candidate eNB—here, the target eNB 21—for handover. The UE 23 may perform measurements on the neighbor cells, such as the target cell 20, by measuring their Reference Symbols Received Power (RSRP), Reference Symbols Received Quality (RSRQ), and so on. In the embodiment of FIG. 2, the message at arrow 44 may indicate that the UE 23 is reporting an "A3" event, which refers to a situation when the UE 23 is receiving signals from the target cell 20 that are better than the signals from its serving cell 17 by a predefined offset. Various other "events" that may trigger measurement reporting by a UE are defined in section 5.5.4 of the earlier-mentioned 3GPP TS 36.331. Some exemplary triggering "events" such as the Event A2, the Event A5, and the Event B2 are discussed later with reference to discussion of FIGS. 9-11.

At block 45, the source eNB 18 may make a decision whether to handover the UE 23 to the target eNB 21 or not based on the Measurement Report received from the UE 23. Upon determining that the UE 23 is to be handed over to the target cell 20, the source eNB 18 may send, at arrow 46, an "X2 Handover Request" to the target eNB 21 with a list of EUTRAN Radio Access Bearers (E-RABs or ERABs) to be admitted by the target eNB 21 as part of the handover. An E-RAB uniquely identifies the concatenation of an S1 bearer and the corresponding data radio bearer as illustrated in FIG. 4 and discussed later below. The admission of a specific E-RAB by the target cell 21 assures UE's 23 continued "link" to the core network 30 for data transfers associated with a service that is currently being received by the UE 23 through the source cell 17. As mentioned earlier, the service may be, for example, a voice call, a multimedia content download, online messaging, and the like. At step 47, the target eNB 21 may perform admission control for each ERAB individually. A more detailed discussion of such admission control is provided later below.

In the embodiment of FIG. 2, a timer 48 may be activated by the source eNB 18 to monitor the time it takes for a response to the handover request to be received from the target eNB 21. The handover procedure may be canceled by the source eNB 18 if the response is not received within a predetermined time period. It is shown in FIG. 2 that a response—in the form of an "X2 Handover Request Acknowledge" message at arrow 49—may be received from the target eNB 21 before the timer 48 expires. The Handover Acknowledge message from the target eNB 21 may contain a list of ERABs acknowledged/admitted by the target eNB 21 and the ERABs rejected (or failed to be admitted) by the target eNB 21. Thereafter, at arrow 50, the source eNB 18 may initiate the handover by sending an "X2 Sequence Number (SN) Status Transfer" message to the target eNB 21 before commencing the forwarding of UE data (at block 51 in FIG. 2) to the target eNB 21. To inform the UE 23 of the handover, the source eNB 18 may send an RRC Connection Reconfiguration message—which is not shown in FIG. 2, but may be similar to the message shown at arrow 70 in FIG. 3—to the UE 23 indicating the target eNB to which the UE 23 should handover to.

Referring now to FIG. 3, the S1 handover in the RRC_Connected state may commence with an "RRC Connection Reconfiguration" message from the source eNB 18 to the UE 23 at arrow 55. The operations 55 through 58 are identical to operations 42-45 in FIG. 2, respectively, and, hence, operations 55-58 are not discussed herein. As shown in FIG. 3, at arrow 59, an "S1 Handover Required" message may be sent from the source eNB 18 to the source MME 32b containing information about the target eNB 21 to which the UE 23 is to be handed over as well as the ERABs to be admitted by the target eNB 21. In the embodiment of FIG. 3, a timer 60 may be implemented at the source eNB 18 to monitor the time it takes for a response to the S1 Handover Required message to be received from the source MME 32b. The source eNB 18 may consider the handover procedure as "failed" if the source eNB 18 does not receive such a response within a predetermined time period. Upon receiving the handover required message at arrow 59, the source MME 32b may send an "S10 Forward Relocation Request" to the target MME 32d as indicated by arrow 61. In response, the target MME 32d may exchange an "S11 Create Session Request/Response" messaging with the target S-GW 32c as indicated by the bi-directional arrow 62. Once a UE-specific session for the target eNB 21 is created at the target S-GW 32c—as indicated by the S11 Create Session Response message from the target S-GW 32c to the target MME 32d, the target MME 32d may send an "S1 Handover Request" to the target eNB 21 as indicated at arrow 63. The HO request at arrow 63 may specify the ERABs to be admitted by the target eNB 21. In response to the handover request from the target MME 32d, at block 64, the target eNB 21 may perform admission control for each ERAB individually. As noted earlier, a more detailed discussion of such admission control is provided later below.

Upon conclusion of admission control, the target eNB 21 may send a response—in the form of an "S1 Handover Request Acknowledge" message at arrow 65—to the target MME 32d. This HO Acknowledge message from the target eNB 21 may contain a list of ERABs acknowledged/admitted by the target eNB 21 and the ERABs rejected (or failed to be admitted) by the target eNB 21. Thereafter, at arrow 66, the target MME 32d may send an "S10 Forward Relocation Response" message to the source MME 32b corresponding to the earlier-sent S10 Forward Relocation Request at arrow 61. The response at arrow 66 may contain information about ERABs admitted by the target eNB 21. The source MME 32b may, in turn, send an "S11 Create Bearer Request" message to the source S-GW 32a and receive an "S11 Create Bearer Response" message from the source S-GW 32a as indicated by the bi-directional arrow 67. The message exchange at arrow 67 would create bearer resources at the source S-GW 32a for transfer of the target eNB-admitted ERABs to the target S-GW 32c where a UE-specific, target eNB-based HO session is already created as noted at arrow 62. Thereafter, a User Plane (UP) may be established between the source S-GW 32a and the target S-GW 32c for UE data forwarding as indicated by the dotted bi-directional arrow 68.

To effectuate the handover, the source MME 32b may provide the source eNB 18 with an "S1 Handover Command" at arrow 69. Consequently, to inform the UE 23 of the successful setup of the handover, the source eNB 18, at arrow 70, may send an "RRC Connection Reconfiguration" message to the UE 23 indicating the target eNB to which the UE 23 should handover to. The message at arrow 70 may provide the UE 23 with an HO command and may also include the neighbor cell measurement configuration similar to the message at arrow 55. The UE 23 can use the measurement configuration to perform measurements on the neighboring cells and report the measurements to the source eNB 18 prior to attaching to the target eNB 21 as part of the handover.

It is pointed out here that although the operations in FIGS. 2-3 are shown numbered in sequence of "1", "2", "3", and so on, such numbering is for illustration and ease of discussion only and does not imply any strict sequential execution of these steps. In alternative embodiments, certain steps may be absent or may be executed in a different order. Furthermore, as mentioned earlier, the source and target S-GWs and MMEs 32a-32d may be part of the same core network, for example, the CN 30 in FIG. 1, or part of the different source and target core networks when the source and target eNBs are controlled by different core networks. Also, these S-GWs and MMEs may be implemented as different nodes in their respective core network(s). However, for ease of discussion herein, the nodes 32a-32d in FIGS. 2-3 are considered as being represented by the "common" network entity 32 in the CN 30 in FIG. 1. In one embodiment, the source and the target eNBs 18, 21, respectively, may be served by the same S-GW and the same MME in the core network 30. Additional different configurations may be possible depending on the implementation of an operator's LTE network.

It is noted here that, in certain embodiments, a network operator may not have configured or implemented an X2 interface between the source eNB 18 and the target eNB 21. In that case, only the S1 handover procedure of FIG. 3 may be carried out. In other words, the X2 HO procedure of FIG. 2 may be optional in an LTE network, but the S1 HO procedure of FIG. 3 may not be.

Admission Control

An LTE network is an all-IP (Internet Protocol) network that is designed to support end-to-end Quality of Service (QoS). Therefore, the purpose of admission control, such as, for example, the admission control at block 47 in FIG. 2 and at block 64 in FIG. 3, is to control admission of UEs and E-RABs in such a way that requested QoS can be achieved for the UE or E-RAB seeking admission in the target cell, as well as for the UEs and E-RABs previously already admitted. A detailed discussion of different types of bearers and associated QoS parameters is provided, for example, in Section 13 of the 3GPP TS 36.300, version 12.2.0 (June 2014), titled "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," the relevant portions of which are incorporated herein by reference in their entireties. In view of the details in this 3GPP TS 36.300, only a brief overview of QoS and admission control is provided below.

FIG. 4 illustrates a bearer architecture 75 depicting some exemplary bearers that may be used to transport packets in an LTE network such as, for example, the LTE network 15 in FIG. 1. For ease of discussion, the bearer architecture 75 is shown in the context of the source eNB 18 and source S-GW 32a. However, it is understood that such bearer architecture also may exist involving the target eNB 21 and target S-GW 32c. In FIG. 4, the UE 23 and the source eNB 18 are shown to comprise an E-UTRAN portion 77 of the LTE network 15, whereas the CN 30 is an Evolved Packet Core (EPC). Together, the E-UTRAN portion 77 and the EPC 30 may be considered to form an Evolved Packet System (EPS). It is understood that many other network nodes or entities may be part of the E-UTRAN portion 77 and the EPC 30 in the CN 30, but, for the sake of simplicity and ease of discussion, only the relevant nodes/entities are shown in FIG. 4. Also, as discussed in more detail in the earlier-mentioned 3GPP TS 36.300, there may be additional bearers above the E-RAB 79 in the hierarchy of bearers in FIG. 4, but such bearers are not shown in FIG. 4 because their lack of relevance to the present disclosure.

In the all-IP LTE network 15, an E-RAB, such as the E-RAB 79, may transport the packets of an EPS bearer (not shown) between the UE 23 and the EPC 30. In the hierarchy of bearers in FIG. 4, an EPS bearer may be logically implemented "above" the E-RAB 79. When an E-RAB exists, there is a one-to-one mapping between this E-RAB and its corresponding EPS bearer. A data radio bearer 81 may transport the packets of the E-RAB 79 between the UE 23 and the source eNB 18. When a data radio bearer exists, there is a one-to-one mapping between this data radio bearer and the E-RAB 79. An S1 bearer 83, on the other hand, transports the packets of the E-RAB 79 between the source eNB 18 and its corresponding source S-GW 32a. Thus, the E-RAB 79 uniquely identifies the concatenation of the S1 bearer 83 and its corresponding data radio bearer 81, thereby providing a "seamless" connection for packets exchanged between the UE 23 and the EPC 30 such as, for example, the packets that are sent to/received from the UE 23 as part of the service—like a voice call—being provided to the UE 23 through the source eNB 18. An E-RAB provides for bearer-level QoS control in the EPC/E-UTRAN. Thus, a packet mapped to the same ERAB would receive the same bearer level packet forwarding treatment such as, for example, scheduling policy, queue management policy, QoS, Radio Link Control (RLC) configuration (which is briefly discussed later below), and the like.

In the LTE network 15, one ERAB may be established when the UE 23 initially connects to the EPC 30, and that ERAB remains established throughout the lifetime of the UE's connection to the EPC 30 to provide the UE 23 with an "always-on" IP connectivity. Such an E-RAB may be referred to as a "default bearer." On the other hand, any additional E-RABs that are established to support the QoS requirements of one or more services being used by the UE 23 in the network 15 may be referred to as "dedicated bearers." The bearer-level QoS parameter values of these ERABs may be assigned by the EPC 30 based on, for example, the UE's 23 subscription data. The establishment, modification, and release of E-UTRAN resources for ERABs may be performed under the control of the EPC 30, more specifically, the source MME 32b in the EPC 30.

An E-RAB may be referred to as a Guaranteed Bit Rate (GBR) bearer if dedicated network resources related to a GBR value associated with the E-RAB are permanently allocated, for example, by an admission control function in an eNB, at the time of bearer establishment/modification. The GBR value may be associated with the QoS requirements in a UE's subscription data. An ERAB that is not a GBR bearer may be referred to as a non-GBR bearer. A dedicated bearer can either be a GBR or a non-GBR bearer, whereas a default bearer is generally a non-GBR bearer.

As discussed in more detail in the earlier mentioned 3GPP TS 36.300, bearer-level QoS parameters may include QoS Class Identifier (QCI), Allocation and Retention Priority (ARP), and GBR, among others. Each ERAB (GBR and non-GBR) may be associated with these bearer-level QoS parameters. Various QCI values are shown in FIG. 5, which is discussed below. The QoS parameter ARP decides whether a bearer establishment/modification request can be accepted or needs to be rejected in case of resource limitations. Thus, the ARP can be used by an eNB such as, for example, the target eNB 21 in FIG. 1 to decide which bearer(s) to admit and which ones to drop, for example, during an HO, because of resource limitations. Thus, the admission control of ERABs is dependent on availability of network resources at the target eNB. The ARP contains information about the priority level of a UE's data traffic. The range of ARP priority level is "1" to "15", with "1" being the highest level of priority. The data traffic having a certain level of GBR requirement may have a corresponding ARP priority level associated therewith. The ARP priority level may be used by the target eNB 21 during an HO to decide which existing bearer(s) to pre-empt due to resource limitations so as to accommodate the source eNB's request to admit a specific ERAB.

Admission control at the target eNB 21 may be performed at RRC Connection Setup, EPS Bearer Setup Handover Request, and EPS Bearer Modification procedures. To accomplish the requested QoS for UEs and E-RABs, the Admission Control functionality at the target eNB 21 may reject UE and E-RAB admission requests on the S1/X2 interfaces based on whether the target eNB's 21 system resources are congested. As noted above, different bearers can be given different priorities based on settings of ARP. This enables to prioritize and protect certain services in case of resource shortage. Lower priority bearers can be released/pre-empted in order to serve the UEs having higher priority bearers.

There are three major types of Admission Control procedures defined in relevant 3GPP specifications: (i) Admission Control for Transmission/Transport network, (ii) Dynamic GBR Admission Control for Radio Network, and (iii) Differentiated Admission Control for ARP based pre-emption. A transmission or transport network exists between an eNB and the MME/S-GW in the core network to which the eNB is connected via an S1 interface. The transmission network may thus include the IP backhaul resources. A radio network, on the other hand, exists between a UE and an eNB.

Admission control algorithms are based on a set of metrics referred to as Monitored System Resources (MSRs). An MSR is a metric that represents a limited system resource that needs to be explicitly monitored to ensure correct and efficient operation of the admission and congestion control procedures at a target eNB. Thus, MSRs include resources such as Physical Resource Blocks (PRBs), Scheduling Elements (SEs), Control Channel Element (CCE), and baseband capacity. The use of the MSRs may be measured by a target eNB—such as the target eNB 21 in FIG. 1—during a measurement period, after which a filtered value for the MSR usage may be calculated. This filtered MSR usage value may be updated after each new measurement period.

The transport network admission control ensures that the sum of GBR (from each ERAB request in S1AP/X2AP procedures) of the admitted ERABs (at a specific target eNB) does not exceed the admission thresholds configured for that target eNB. The S1AP and X2AP procedures are discussed in more detail, for example, in the earlier-mentioned 3GPP TS 36.413 and 36.423, respectively.

RLC Transmission Modes

Radio Link Control (RLC) protocol for the UE-E-UTRAN radio interface is described in more detail in the 3GPP TS 36.322, version 12.0.0 (June 2014), titled "3rd Generation Partnership Project; Technical Specification Group Radio Access Network; Evolved Universal Terrestrial Radio Access (E-UTRA); Radio Link Control (RLC) protocol specification (Release 12)." In view the detailed discussion in the 3GPP TS 36.322, only a brief overview of RLC transmission modes is provided herein.

Functions of the RLC sub-layer are performed by RLC entities. For an RLC entity configured at the eNB, there is a peer RLC entity configured at the UE, and vice versa. An RLC entity receives/delivers RLC Service Data Units (SDUs) from/to upper layer and sends/receives RLC Protocol Data Units (PDUs) to/from its peer RLC entity via lower layers. The RRC functionality—in the UE and in the eNB—is generally in control of the RLC configuration. An RLC entity can be configured to perform data transfer in one of the following three modes: (i) Transparent Mode™, (ii) Acknowledged Mode (AM), and (iii) Unacknowledged Mode (UM). Consequently, an RLC entity is categorized as a TM RLC entity, an UM RLC entity, or an AM RLC entity depending on the mode of data transfer that the RLC entity is configured to provide. The RLC™ mode is not relevant to the HO-related discussion herein and, hence, is not addressed below.

For RLC UM bearers, both RLC Sequence Number (SN) and Packet Data Convergence Protocol (PDCP) SN are reset at handover and the target eNB starts sending UM packets with PDCP SN starting from "0." However, the RLC mode of the bearers must not be changed during handover. If the RLC mode of the bearers is different in the source and the target eNBs, then the bearers are not set up in the target eNB. It is noted here that RLC mode is configured for each QCI by an eNB. Thus, if the source eNB 18 (FIG. 1) has a bearer with QCI configured with the RLC UM feature and the target eNB 21 has mapped the same QCI to RLC AM, the bearer will be rejected by the target eNB 21 during HO. Similarly, if the target eNB has an invalid RLC in UM feature license, the HO can only be performed with RLC AM bearers. The UM bearers will be rejected by the target eNB.

QCI Values

As noted earlier, QCI values provide a mechanism for QoS support in LTE. QCI is a scalar that is used as a reference to node-specific parameters that control packet forwarding treatment and that have been pre-configured by the operator owning/operating the node such as, for example, the source eNB 18 or the target eNB 21 in FIG. 1. The packet forwarding treatment may include, for example, scheduling weights, queue management thresholds, packet loss rate, packet delay budget, link layer protocol configuration, and so on. In LTE, each IP bearer—for example, an ERAB—has an associated QCI value that determines how the bearer is handled in the LTE eNodeBs such as, for example, the eNBs 18 and 21 in FIG. 1, and in the EPC 30.

FIG. 5 shows a table 85 listing currently-standardized QCI values in LTE for different types of wireless communications. A more detailed version of the table 85 may be obtained by consulting, for example, the table 6.1.7 in 3GPP TS 23.203, version 11.8.0 (Dec. 2012), titled "3GPP: TS Group Services and System Aspects; Policy and Charging Control Architecture (Release 11)." Standardization of a QCI with corresponding characteristics such as "Resource Type" of the QCI, "Priority" level for the QCI, and the like, ensures that applications/services mapped to that QCI receive the same minimum level of QoS in multi-vendor network deployments and also in case of roaming, regardless of a UE's current access (3GPP or non-3GPP).

In FIG. 5, the one-to-one mapping between nine (9) standardized QCI values and some of the standardized characteristics is shown. The standardized characteristics shown in FIG. 5 include (i) the "Resource Type" of a particular QCI value—i.e., whether the QCI value is a Guaranteed Bit Rate (GBR) QCI value or a non-GBR QCI value, and (ii) a "Priority" level associated with that QCI value. The "Resource Type" (or, simply the "Type") may determine if dedicated network resources such as, for example, radio resources, related to a service or bearer level GBR value are permanently allocated. As shown in FIG. 5, every QCI (GBR and non-GBR) is associated with a "Priority" level, which may be used as a basis for assigning the uplink (UL)/downlink (DL) priority per radio bearer. The "Priority" level is provided on a scale of "1" through "9." Priority level "1" is the highest priority level, and priority level "9" is the lowest priority level. Thus, for example, it is seen from the table 85 in FIG. 5 that the non-GBR QCI value=5 as the highest priority level, whereas the non-GBR QCI value=9 has been assigned the lowest priority level. The non-GBR QCI value=5 may be related to IP Multimedia Subsystem (IMS) related signaling traffic, whereas the non-GBR QCI value=9 may be related to buffered streaming of video data or Transmission Control Protocol (TCP)-based data such as, for example, World Wide Web (www) surfing, e-mail, chat, File Transfer Protocol (FTP) file transfer, Person-to-Person (P2P) file sharing, and the like. Other service applications such as, for example, conversational voice, real-time gaming, and so on, have priority levels between these two ranges as shown in FIG. 5. For the sake of brevity, these services and their associated Resource Types and Priority levels are not discussed here in view of the details shown in the table 85 in FIG. 5.

SUMMARY

Currently, during the handover preparation phase, all the radio bearers for the associated QCIs have to be individually admitted by the target cell. Failure in admission of any one of them will still result in a handover "success," but it will be a "partial" handover due to a missing bearer in the target cell. For example, it is seen from the discussion in sections 2.5.2 and 19.2.2.5.1 in the above-mentioned 3GPP TS 36.300 that a handover will occur even when some E-RABs are not admitted by the target cell. A handover will fail only when no resource is available on the target side. In other words, so long as some—even if not all—of the requested bearer resources are available, the target cell will respond with X2/S1 Handover Request Acknowledge message(s) and the HO will not fail.

At present, in an HO procedure, all the bearers have to go through admission control separately. Due to this, even if any of the bearers is admitted, it is considered a successful handover. However, for services like Voice over LTE (VoLTE), bearers with QCI 1 (for voice as shown in FIG. 5) and QCI 5 (for IMS signaling as shown in FIG. 5) are mandatory to sustain the voice call, so a failure to admit any of these mandatory bearers will eventually lead to a release of the voice call due to inactivity—because of the missing QCI 1 GBR bearer or the QCI 5 non-GBR bearer—in spite of a successful handover, albeit "partial". In other words, for services like VoLTE, if the failed-to-be-admitted bearer is one of the signaling or voice bearers, then it can lead to a dropped call for a UE going through the handover even if the HO is successful (partial).

It is known that VoLTE is an LTE-based service that delivers voice calls over an LTE network. This approach is based on the IMS network and results in the voice service being delivered as data flows within the LTE data bearer. Thus, for the VoLTE service, there may be no dependency on or requirement for a legacy circuit-switched voice network to be maintained. VoLTE provides increased voice and data capacity over legacy networks.

Presently, there are no actions taken to maintain the VoLTE service during the above-mentioned partially successful handovers. Following are some of the possible reasons why certain bearers can fail admission in the target eNB during an HO: (i) Wrong settings in source eNB and target eNB configurations. For example, transport mode setting, PDCP SN length or RLC SN length for QCI 1 may be different in the source and the target eNBs, or the QCI 1 profile may not have been defined in the target eNB, and so on. Such issues are not easy to identify because the calls are released after a successful handover. Because the HO has not failed, such issues may get unnoticed. (ii) Due to congestion or admission control restrictions in the target eNB. This may result in unavailability of resources for certain bearers being handed over to the target cell from the source cell.

FIG. 6 is an exemplary call flow trace 87 for a UE-based voice call under existing handover procedures, wherein the call flow trace shows a successful handover with a failed admission of QCI 1 bearer which eventually leads to a system release of the call due to user inactivity. It is seen from the example in FIG. 6 that the source eNB sends an X2_Handover_Request message 89 to the target eNB requesting admission of three ERABs as indicated by blocks 91 and 93-95. The ERABs are assigned with ID numbers 5, 6, and 7, respectively, as can be seen from blocks 93-95. The first ERAB at block 93 has a QCI value of "8", the second ERAB at block 94 has the QCI value of "5", and the third ERAB at block 95 has the QCI value of "1" as indicated by block 97. The block 98 in the call trace 87 indicates that out of the three ERABs requested to be setup in the X2_Handover_Request message, only two ERABs were admitted by the target eNB as detailed in blocks 99 and 100. These ERABs were indicated as being "admitted" through an X2_Handover_Request_Acknowledge message 102 from the target eNB. However, the main bearer for carrying the speech packets is the ERAB with ID 7 (block 95) and QCI 1 (block 97), and this ERAB was not admitted as can be seen from the details in block 104-106. In any event, the HO was still successful as confirmed through the RRC_Connection_Reconfiguration_Complete message 108 to the UE. However, in the absence of the QCI 1 bearer 95 in the target eNB, the user of the UE will not be able to listen or send any voice data. This may trigger an inactivity timer expiry from the network side (as indicated at block 110) causing subsequent release of the UE_Context as can be seen from the S1_UE_Context_Release_Request message 112 sent by the (target) MME to the target eNB. The timer may be programmable such that it triggers an inactivity condition if no voice data is sent to or received from the UE during a programmable time period such as, for example, 5 seconds or 10 seconds. The voice call thus fails because of user inactivity resulting from the target eNB's failure to admit a mandatory ERAB associated with the voice call, and not because of a user mistake or disconnection.

It is therefore desirable to address the anomalous situation of having a successful (partial) handover, but unsuccessful retention of the ongoing service after the handover. This anomalous situation needs to be mitigated to effectively improve the service level retainability for a UE. As noted earlier, the ongoing service may be a voice call, a multimedia content download, online messaging, and the like. In case of VoLTE, it is desirable to prevent dropped calls due to user inactivity caused by the target eNB's failure to admit one of the mandatory signaling or voice bearers for VoLTE.

Particular embodiments of the present disclosure provide for a system and method to sustain an on-going voice service over VoLTE, or any other service in an LTE network, during handovers. To accomplish this objective, the source eNB may be configured to perform a few extra steps before execution of handover to the target cell. In particular embodiments, the source eNB may maintain a list of potential target cells reported by the UE to be handed over. As noted earlier at arrows 44 (FIG. 2) and 57 (FIG. 3), a UE may report such cells in an RRC_Measurement_Report sent to the source cell. If the best cell in the list fails to admit all the mandatory ERABs as part of supporting one or more QCIs associated with the service being provided to the UE, then the source eNB will not perform the HO to the target cell. Rather, the source eNB will attempt the HO to the next best cell reported in the RRC_Measurement_Report and satisfying the criteria associated with an "A3" or an "A5" event defined for E-UTRAN. The A3, A5, and other events relevant to the present disclosure are briefly discussed later below. If the next best cell also fails to admit all the mandatory ERABs and if there are no other intra-LTE cells reported in the UE's Measurement Report, then the source cell may reconfigure the UE to search for cells on other frequencies so that it can handover the UE's voice call to other inter-LTE cells or inter-Radio Access Technology (inter-RAT) cells by performing the Single Radio Voice Call Continuity (SRVCC) procedure.

In one embodiment, the present disclosure is directed to a method of sustaining an ongoing service when a UE is to be handed over to a target eNB by a source eNB in a wireless system, wherein the service is being provided to the UE through the source eNB. The method comprises performing the following using the source eNB: (i) receiving, from the UE, a list of potential target eNBs for handover of the UE; (ii) sending a request to a (first) target eNB in the list for the handover of the UE, wherein the request includes all mandatory Radio Access Bearers (RABs) to be admitted by the target eNB as part of supporting one or more Quality of Service Class Identifiers (QCIs) associated with the service; (iii) receiving an indication from the target eNB that the target eNB has admitted some but not all of the mandatory RABs; and (iv) preventing the handover of the UE to the target eNB in response to receiving the indication from the target eNB.

In one embodiment, as part of sending the request to the target eNB, the source eNB may perform the following: (i) determine that a counter at the source eNB has a value that is less than or equal to a pre-determined number; and (ii) send the request to the target eNB in response to the determination. Furthermore, in one embodiment, the method also comprises performing the following using the source eNB: (i) incrementing the value of the counter by "1"; (ii) starting at a timer at the source eNB: (iii) determining that at least the following two conditions are satisfied: (a) the timer has expired, and (b) the incremented value of the counter is less than or equal to the pre-determined number; and (iv) re-sending the request to the target eNB in response to this determination.

In a further embodiment, the method comprises further performing the following using the source eNB: determining that one of the following conditions is satisfied: (a) the list contains only the first target eNB as a potential target eNB that satisfies criteria associated with either an A3 event or an A5 event defined for E-UTRAN, and a source eNB-based buffered report from the UE identifies the first target eNB as the best potential target eNB that satisfies the criteria associated with either the A3 event or the A5 event; or (b) a second target eNB in the list also fails to admit at least one of the mandatory RABs, and the source eNB-based buffered report from the UE identifies the first target eNB as the best potential target eNB that satisfies the criteria associated with either the A3 event or the A5 event.

In one embodiment, the method further comprises performing the following using the source eNB: (i) establishing at least one QCI-specific counter at the source eNB; and (ii) incremengint the counter every time a mandatory RAB associated with a corresponding QCI fails to be admitted by a potential target eNB in the list as part of the HO of the UE.

In one embodiment, the method comprises further performing the following using the source eNB: (i) sending a request to a second target eNB in the list for the HO of the UE, wherein the request includes all mandatory RABs to be admitted by the second target eNB as part of supporting the one or more QCIs associated with the service; (ii) receiving an indication from the second target eNB that the second target eNB has admitted all the mandatory RABs; and (iii) initiating the HO of the UE to the second target eNB in response to receiving the indication from the second target eNB.

In a further embodiment, the method comprises further performing the following using the source eNB: (i) receiving, from the UE, a measurement report that identifies an inter-Radio Access Technology (RAT) neighbor cell which supports the handover of the UE using a Single Radio Voice Call Continuity (SRVCC) procedure; (ii) determining that one of the following conditions is satisfied: (a) the list contains only the first target eNB as a potential target eNB that satisfies criteria associated with either an A3 event or an A5 event defined for E-UTRAN, and there is no source eNB-based buffered report from the UE which identifies one or more potential target eNBs that satisfy the criteria associated with either the A3 event or the A5 event, (b) the first target eNB and a second target eNB in the list both fail to admit at least one of the mandatory RABs, and there is no source eNB-based buffered report from the UE which identifies one or more potential target eNBs that satisfy the criteria associated with either the A3 event or the A5 event, or (c) there is a single buffered report from the UE at the source eNB which identifies one or more potential target eNBs that satisfy criteria associated with either the A3 event or the A5 event, and the first target eNB in the list and a third target eNB in the single buffered report both fail to admit at least one of the mandatory RABs; and (iii) in response to the determination, initiating the handover of the UE to the inter-RAT neighbor cell using the SRVCC procedure.

In one embodiment, the source eNB continues to serve the UE if the HO to the inter-RAT neighbor cell fails using the SRVCC procedure.

In another embodiment, the present disclosure is directed to a network entity in a cellular network for sustaining an ongoing service when a mobile device associated with a serving cell is to be handed over by the network entity. The network entity comprises: (i) a transceiver for wirelessly communicating with the mobile device and for facilitating provision of the service to the mobile device in the serving cell; (ii) a memory for storing program instructions; and (iii) a processor coupled to the memory and the transceiver and configured to execute the program instructions, which, when executed by the processor, cause the network entity to perform the following: (a) receive, from the mobile device, a list of potential target entities for handover of the UE; (b) send a request to a target entity in the list for the handover of the mobile device, wherein the request includes all mandatory RABs to be admitted by the target entity as part of supporting one or more QCIs associated with the service; and (c) perform the handover of the UE to the target entity only if the target entity sends a response to the request that indicates that the target entity has admitted all of the mandatory RABs.

The network entity may be one of the following: (i) a Radio Base Station (RBS); (ii) a Base Station Controller (BSC); (iii) a Radio Network Controller (RNC); and (iv) an evolved Node B (eNodeB).

In one embodiment, the network entity may be operative to: (i) establish at least one QCI-specific counter at the network entity; and (ii) increment the QCI-specific counter every time a mandatory RAB associated with a corresponding QCI fails to be admitted by a potential target entity in the list as part of the handover of the mobile device.

In another embodiment, when the response from the target entity indicates that the target entity has failed to admit at least one of the mandatory RABs, the network entity may be operative to perform the following: (i) receive, from the mobile device, a measurement report that identifies an inter-RAT neighbor cell which supports the handover of the mobile device using an SRVCC procedure; and (ii) initiate the handover of the mobile device to the inter-RAT neighbor cell using the SRVCC procedure.

In a further embodiment, the present disclosure is directed to a wireless system comprising a source eNB; and a target eNB that is in communication with the source eNB. In the wireless system, the source eNB is configured to perform the following as part of sustaining an ongoing service when a UE is to be handed over by the source eNB: (i) facilitate provision of the service to the UE in a serving cell associated with the source eNB; (ii) receive, from the UE, a list of potential target eNBs for handover of the UE; (iii) determine that an attempt counter at the source eNB has a value that is less than or equal to a pre-determined number; (iv) in response to the determination, send a request to the target eNB in the list for the handover of the UE, wherein the request includes all mandatory RABs to be admitted by the target eNB as part of supporting one or more QCIs associated with the service; (v) receive an indication from the target eNB that the target eNB has admitted some but not all of the mandatory RABs; and (vi) prevent the handover of the UE to the target eNB in response to receiving the indication from the target eNB. In the wireless system, the target eNB is configured to perform the following: (i) receive the request from the source eNB; (ii) perform target eNB-specific admission control for the mandatory RABs based on target eNB-specific available radio resources; and (iii) send the indication to the source eNB based on the result of the target eNB-specific admission control.

By preventing successful, but "partial" handovers when all mandatory ERABs for associated QCIs are not admitted by the target cell, particular embodiments of the present disclosure provide for significant improvement in the retainability of VoLTE calls or other services. The user of a UE can thus receive uninterrupted delivery of a currently on-going service during a handover. Furthermore, particular embodiments of the present disclosure introduce new counters at the source cell to provide the network operator with the ability to track (target) cells causing failure of particular ERABs. In case of a voice call, the SRVCC triggering allows the source cell to sustain the voice call service to the UE if no proper candidate cell is available to admit all necessary ERABs through an intra-LTE handover.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the disclosure. However, it will be understood by those skilled in the art that the disclosed invention may be practiced without these specific details. In other instances, well-known methods, procedures, components and circuits have not been described in detail so as not to obscure the present disclosure. Additionally, it should be understood that although the disclosure is described primarily in the context of a 3GPP LTE cellular telephone/data network, the described invention can be implemented, with suitable modifications, in other wireless networks (cellular or non-cellular) that require bearer admissions during handovers. Thus, the use of the term "cell"—as in the "serving cell," "source cell," "neighbor cell," or the "target cell"—in the discussion below should not be construed to be limited to a cellular structure only.

Figure 7:
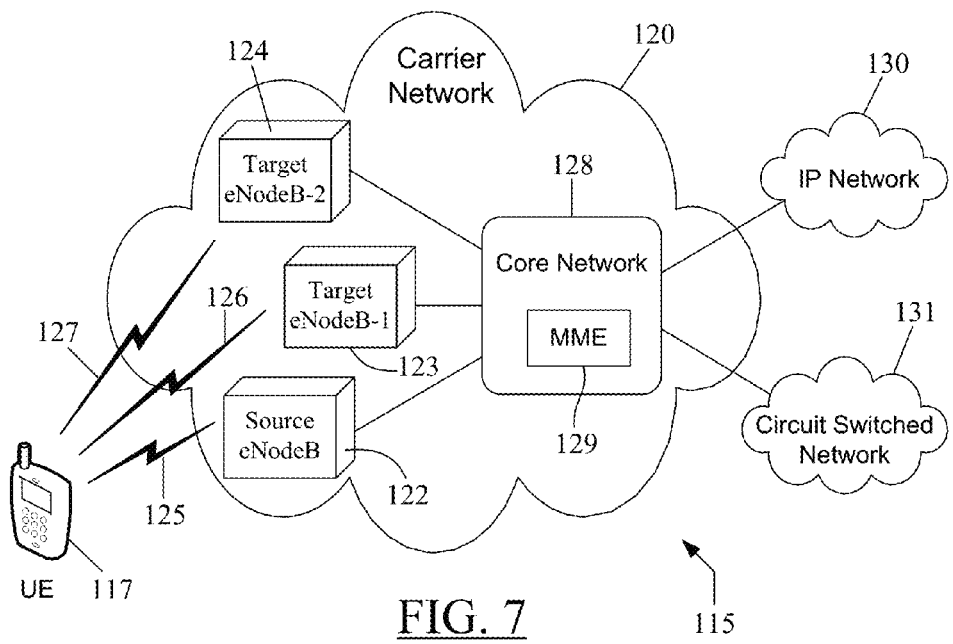
FIG. 7 is a diagram of an exemplary wireless system in which the service-retaining handover methodology shown in FIGS. 8-11 according to the teachings of particular embodiments of the present disclosure may be implemented.

FIG. 7 is a diagram of an exemplary wireless system 115 in which the service-retaining handover methodology shown in FIGS. 8-11 according to the teachings of particular embodiments of the present disclosure may be implemented. An exemplary wireless or mobile device 117 is shown as being operational in the system 115 through a mobile communication network 120. In the discussion herein, the terms "wireless network," "mobile communication network," "operator network," or "carrier network" may be used interchangeably to refer to a wireless communication network 120 that facilitates voice and/or data communication with different types of wireless devices, like the device 117. The carrier network 120 may be a cellular network, a proprietary data communication network, a corporate-wide wireless network, and the like.

In one embodiment, the wireless device 117 may be a UE or a Mobile Station (MS) capable of receiving/sending data content such as, for example, audio data as part of a voice call, audio-visual data as part of a video call, textual, graphical, and/or pictorial data associated with online gaming, and the like, from/to the network 120. The data may be received through streaming, downloading, Short Messaging Service (SMS), and the like. The wireless device 117 may be referred to by such analogous terms as "mobile handset," "wireless handset," "mobile device," "mobile terminal," and the like. Some examples of UEs or mobile handsets/devices include cellular telephones or data transfer equipments, smartphones, handheld or laptop computers, Bluetooth® devices, electronic readers, portable electronic tablets, and the like. The data transfer equipment may include a Personal Digital Assistant (PDA) or a pager. The smartphones may include iPhone™' Android™ phones, Blackberry™ devices, and the like.

Figure 1:
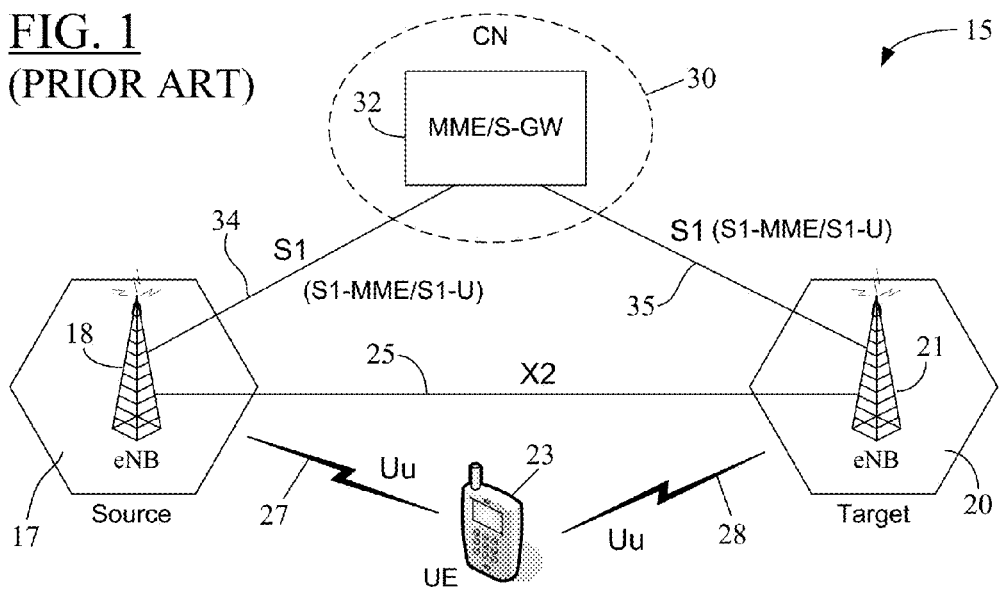
FIG. 1 illustrates certain network interfaces in a 3GPP LTE network.

In the embodiment of FIG. 7, the carrier network 120 is shown to include three exemplary base stations (BS) or eNodeBs/eNBs 122-124. The UE 117 is shown to receive radio signals from each of these neighboring eNBs 122-124 via respective Radio Frequency (RF) links 125-127, each of which may represent the "Uu" interface discussed earlier with reference to FIG. 1. It is noted here that when the wireless network 120 is a cellular LTE network, the eNB 122 may be associated with a particular cell—known as the "source cell"—and may provide RF coverage to the UE 117 as its source/serving eNB. The UE 117 may be served by the eNB 122 because it may be physically present, registered, associated with, for example, through RF coverage or prior handover, or operating within the eNB's source cell (not shown). The eNB 122 may be somewhat similar to the eNB 18 in FIG. 1, but may have additional functionality according to the teachings of the present disclosure. The neighboring eNBs 123-124 represent two potential "target" eNBs to which the UE 117 may be handed over by the source eNB 122 as discussed later below. For ease of drawing, various source and target cells—like the cells 17 and 20 in FIG. 1—are not shown in FIG. 7.

The UE 117 is assumed to be "attached" to the source eNB 122—that is, the eNB 122 may be considered to be in "control" of the UE 117 and providing RF coverage to the UE 117 prior to its handover. It is noted that any of the other base stations 123-124 may also perform as a "source eNB" for their respective UEs (not shown). For ease of illustration, all of the eNBs 122-124 in the embodiment of FIG. 7 are shown to be served and controlled by the same Core Network (CN) 128. These eNBs 122-124 may connect to the CN 128 using respective "S1" interfaces in the manner similar to that shown in FIG. 1. It is understood that there may be additional core networks (not shown), either in the same operator's network 120 or in other carrier networks (not shown) in the wireless system 115. In that case, one or more of the eNBs 122-124 may be under operative control of a different core network than the CN 128 shown in FIG. 7. Also, two or more of the eNBs 122-124 may be interconnected using respective "X2" interfaces in the manner similar to that shown in FIG. 1. The embodiment in FIG. 7 may be considered to represent a network configuration for an intra-LTE handover scenario. Although the discussion below also addresses handovers to inter-LTE or inter-RAT cells using the Single Radio Voice Call Continuity (SRVCC) procedure, network configurations for such inter-RAT or inter-LTE handovers are not illustrated for the sake of brevity and simplicity of drawings.

In the wireless network 120 of FIG. 7, the source eNodeB 122 may be configured to implement the source eNB-related steps outlined in the flowcharts in FIGS. 8-11, which are discussed later below. It is understood that any of the other base stations 123-124 may be similarly configured as well. In addition to providing air interface or communication channel to the UE 117, the BS 122 may also perform radio resource management using, for example, channel feedbacks received from the UE 117. The communication channel, for example, an RF channel (not shown), between the eNB 122 and the UE 117 may provide a conduit for the signals exchanged between the eNB 122 and UE 117. The base station 122 may provide radio interface—in the form of RF link 125—to the device 117 via an antenna unit, and with or without the help of a secondary entity such as a pico or femto base station (not shown). The antenna unit is not shown in FIG. 7, but shown as the unit 194 in FIG. 12. Thus, terminals operating in a wireless network may exchange information with one another via a base station in the network over a communication channel or link between the base station and the wireless terminals. The wireless network 120 may be a dense network with a large number of wireless terminals operating therein. For ease of illustration, only one such device 117 is shown in FIG. 7. The carrier network 120 may support stationary as well as mobile devices. The mobile communication network 120 may be a cellular carrier network operated, managed, and/or owned by a wireless service provider (or operator).

In one embodiment, one or more of the base stations 122-124 may be base stations in a Third Generation (3G) network, or home base stations or femtocells, and may provide radio interface to respective mobile handsets attached thereto. In other embodiments, the base station may also include a site controller, an access point (AP), a Base Station Controller (BSC), a radio tower, or any other type of radio interface device capable of operating in a wireless environment.

Each base station (BS) 122-124 in FIG. 7 may be referred to as a "network entity," "access node" or "mobile communication node." In case of a 3G carrier network 120, the base stations 122-124 may include functionalities of a 3G RBS along with some or all functionalities of a 3G Radio Network Controller (RNC), and any or all of the BSs 122-124 may be configured to perform the service-retaining handover discussed below with reference to BS 122 as an example. Communication nodes in other types of carrier networks such as, for example, Second Generation (2G) or Fourth Generation (4G) networks, and beyond, also may be configured similarly. In the embodiment of FIG. 7, the node 122 may be configured (in hardware, via software, or both) to implement the service-retaining handover approach as per teachings of the present disclosure. For example, when existing hardware architecture of the access node 122 cannot be modified, the handover methodology according to one embodiment of the present disclosure may be implemented through suitable programming of one or more processors in the access node 122 or a Base Station Controller (BSC) (if available). Such processor(s) may be, for example, the processor 190, or, more particularly, the processing unit 200 shown in FIG. 12. The execution of the program code by a processor in the node 122 may cause the node 122 to perform the eNB-related steps outlined in FIGS. 8-11 (discussed later). Thus, in the discussion below, although the communication node 122 (or its BSC) may be referred to as "performing," "accomplishing," or "carrying out" a function or process, it is evident to one skilled in the art that such performance may be technically accomplished in hardware and/or software as desired.

Although the discussion herein primarily refers to a base station or an eNB as a "network entity," it is understood that in certain embodiments the term "network entity" may refer to, for example, a macro base station operating in conjunction with a secondary entity such as a pico or femto base station, a secondary entity such as a pico or femto base station, a group of base stations, an RNC, a Base Transceiver Station (BTS)—with or without the functionalities of a BSC, a core network, a BSC, or a combination of one or more base stations—with or without the functionalities of a BSC or an RNC—and a CN. For example, when certain RNC functionalities supporting the handovers according to the teachings of the present disclosure are implemented in a CN, the CN may represent the "network entity". If such RNC functionalities are distributed between a BS/eNB and a CN, then the "network entity" may be a combination of such a BS/eNB and the CN. On the other hand, in particular embodiments, a combination of multiple base stations or a single BS and some other node(s) (not shown) may constitute a "network entity". Another entity, which may be IP-based, in the network 120 or in the wireless system 115 other than those mentioned above may be configured to perform as a "network entity" as per the teachings of the present disclosure. Any of the network entities mentioned herein may "perform," "accomplish," or "carry out" a function or process using a suitably-configured hardware and/or software as desired.

The CN 128 in the carrier network 120 may be coupled to the base stations 122-124 and may provide logical and control functions such as, for example, terminal mobility management; access to external networks or communication entities; subscriber account management, billing, supporting the delivery of a subscriber-selected service such as a VoLTE voice call, and the like; Internet Protocol (IP) connectivity and interconnection to other networks (e.g., the Internet) or entities; roaming support; and so on. In that regard, the CN 128 may include a Mobility Management Entity (MME) 129. In one embodiment, the MME 129 may be similar to the MME 32 shown in FIG. 1, but additionally-configured to support the service-retaining handover methodology according to particular embodiments of the present disclosure. Hence, although the functionalities of the MME 129 may be "shared" by all of the eNBs 122-124 in the network 120, the MME 129 may be referred to as the "source MME" in the context of FIGS. 10-11 just for ease of discussion.

In case of an LTE carrier network, the CN 128 may include some or all functionalities of an Access Gateway (AGW) or an Evolved Packet Core (EPC), or may function in conjunction with a subnet-specific gateway/control node (not shown). In certain embodiments, the CN 128 may be, for example, an International Mobile Telecommunications (IMT) CN such as a 3GPP CN. In other embodiments, the CN 128 may be, for example, another type of IMT CN such as a 3GPP2 CN (for Code Division Multiple Access (CDMA) based cellular systems), or an ETSI TISPAN (European Telecommunications Standards Institute TIPHON (Telecommunications and Internet Protocol Harmonization over Networks) and SPAN (Services and Protocols for Advanced Networks)) CN.

Regardless of the type of the carrier network 120, the core network 128 may function to provide connection of one or more of the UEs, like the UE 117, to their respective source/target eNBs and, through the eNBs, to other mobile handsets operating in the carrier network 120 and also to other communication devices or resources in other voice and/or data networks external to the carrier network 120. The communication devices may include wireline or wireless phones, whereas the resources may include an Internet website. The core network 128 may be coupled to a packet-switched network 130 such as, for example, an Internet Protocol (IP) network like the Internet as well as to a circuit-switched network 131 such as the Public-Switched Telephone Network (PSTN) to accomplish the desired connections for the UE 117 beyond the devices operating in the carrier network 120. Thus, through the source eNB's 122 connection to the core network 128 and the UE's 117 radio link 125 with the source eNB 122, a user of the UE 117 may wirelessly (and seamlessly) access many different resources or systems beyond those operating within the operator's network 120.

The carrier network 120 may be a cellular telephone network, a Public Land Mobile Network (PLMN), or a non-cellular wireless network which may be a voice network, data network, or both. As noted earlier, the carrier network 120 may include multiple cell sites (not shown). A wireless terminal, such as the UE 117, may be a subscriber unit in the carrier network 120. Furthermore, portions of the carrier network 120 may include, independently or in combination, any of the present or future wireline or wireless communication networks such as, for example, the PSTN, an IP Multimedia Subsystem (IMS) based network, or a satellite-based communication link. Similarly, as also mentioned above, the carrier network 120 may be connected to the Internet via its core network's 128 connection to the IP network 130 or may include a portion of the Internet as part thereof. In one embodiment, the operator network 120 or the wireless system 115 may include more or less or different types of functional entities than those shown in FIG. 7.

Although various examples in the discussion below are provided primarily in the context of an LTE network, the teachings of the present disclosure may equally apply, with suitable modifications as may be apparent to one skilled in the art using the present teachings, to a number of different Frequency Division Multiplex (FDM) or Time Division Multiplex (TDM) based wireless systems or networks—cellular or non-cellular—that may support handovers of mobile handsets and may require admissions of bearers or similar conduits during handovers. Such networks or systems may include, for example, standard-based systems/networks using Second Generation (2G), Third Generation (3G), or Fourth Generation (4G) specifications, or non-standard based systems. Some examples of such systems or networks include, but not limited to, Global System for Mobile communications (GSM) networks, Telecommunications Industry Association/Electronic Industries Alliance (TIA/EIA) Interim Standard-136 (IS-136) based Time Division Multiple Access (TDMA) systems, Wideband Code Division Multiple Access (WCDMA) systems, 3GPP LTE networks, WCDMA-based High Speed Packet Access (HSPA) systems, 3GPP2's CDMA based High Rate Packet Data (HRPD) systems, CDMA2000 or TIA/EIA IS-2000 systems, Evolution-Data Optimized (EV-DO) systems, Worldwide Interoperability for Microwave Access (WiMAX) systems based on Institute of Electrical and Electronics Engineers (IEEE) standard IEEE 802.16e, Wireless Fidelity (WiFi) networks, International Mobile Telecommunications-Advanced (IMT-Advanced) systems such as LTE Advanced systems, other Universal Terrestrial Radio Access Networks (UTRAN) or Evolved-UTRAN (E-UTRAN) networks, GSM/Enhanced Data Rate for GSM Evolution (GSM/EDGE) systems, a non-standard based proprietary corporate wireless network, and so on.

Figure 8:
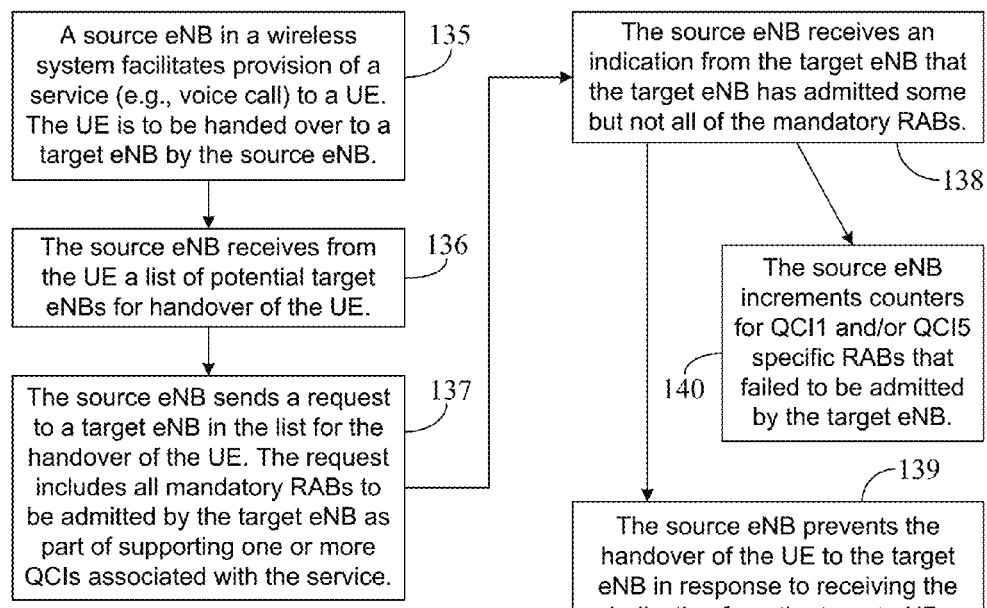
FIG. 8 is an exemplary flowchart depicting a general outline of how a network entity may perform the service-retaining handover methodology in a cellular network according to one embodiment of the present disclosure.

FIG. 8 is an exemplary flowchart 133 depicting a general outline of how a network entity, such as, for example, the source eNB 122 in FIG. 7, may perform the service-retaining handover methodology in a cellular network, such as, for example, the carrier network 120 in FIG. 7, according to one embodiment of the present disclosure. Additional details of the flowchart 133 are provided later through the exemplary embodiments in FIGS. 9-11. As indicated at block 135 in FIG. 8, the source eNB 122 in the wireless system 115 may facilitate provision of a service to the UE 117. In the discussion of FIGS. 8-11, an LTE/VoLTE voice call is used as an example of such a "service" being provided to the UE 117 in the network 120. The source eNB 122 may facilitate provision of the voice call service through its interaction with other network elements such as, for example, the network elements in the core network 128. During the ongoing voice call, the UE 117 may need to be handed over to a target eNB by the source eNB 122. As mentioned earlier, two potential target eNBs for an intra-LTE handover are shown by reference numerals "123" and "124" in FIG. 7. The handover may be required, for example, when the UE 117 is mobile and the strength of the signals received from its source eNB 122 may no longer satisfy a predefined threshold for sustained attachment to the source eNB 122, whereas the strength of the signals received from one or more of the neighboring base stations 123-124 may be more favorable for sustaining the UE's 117 current service session in the network 120. In that regard, the neighboring base stations 123-124 may qualify as "potential target" base stations that the source eNB 122 may consider for handover of the UE 117. The source eNB 122 may be made aware of these potential target eNBs 123-124 when the source eNB 122 receives from the UE 117 a list of these eNBs for future handover of the UE 117, as indicated at block 136 in FIG. 8.

Figures 4, 5:
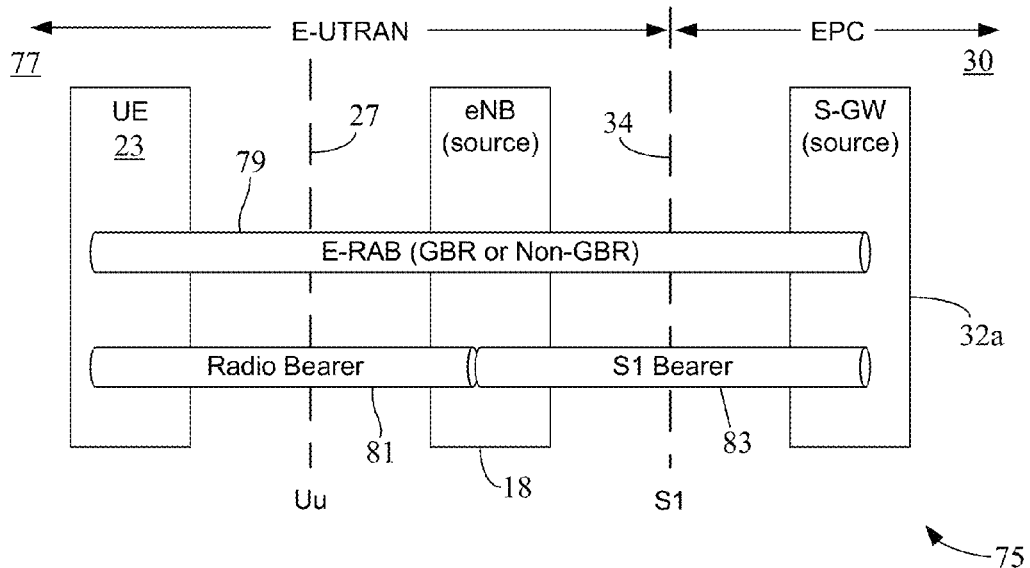
FIG. 4 illustrates a bearer architecture depicting some exemplary bearers that may be used to transport packets in an LTE network.
FIG. 5 shows a table listing currently-standardized QCI values in LTE for different types of wireless communications.
Figure 6:
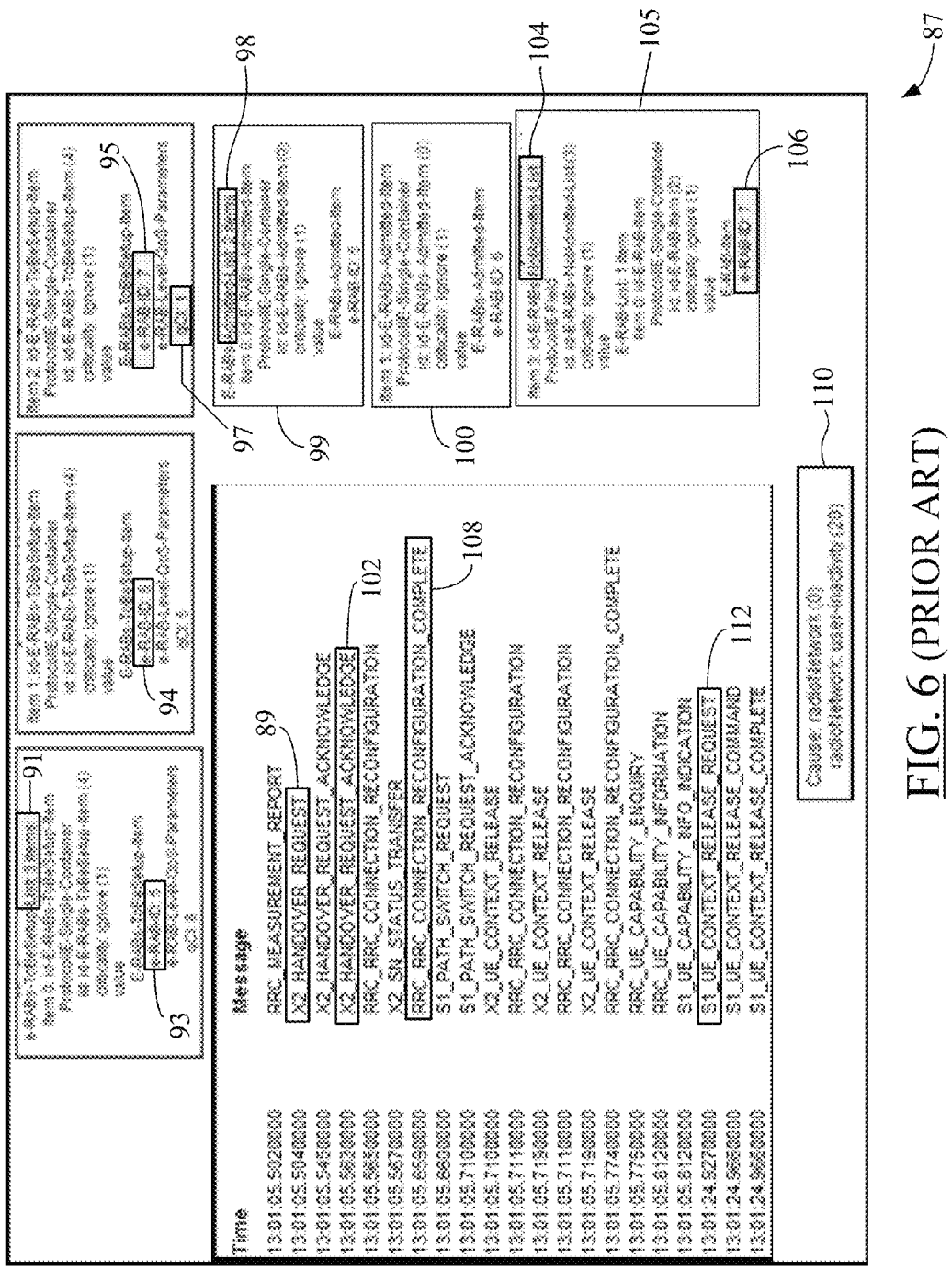
FIG. 6 is an exemplary call flow trace for a UE-based voice call under existing handover procedures, wherein the call flow trace shows a successful handover with a failed admission of QCI 1 bearer which eventually leads to a system release of the call due to user inactivity.

At block 137, the source eNB 122 may send a request to a target eNB, for example, the target eNB 123 in FIG. 7, for the handover of the UE 117. As noted above, this target eNB 123 is one of the target eNBs in the list received at block 136. The request may include all mandatory RABs to be admitted by the target eNB 123 as part of supporting one or more QCIs associated with the currently ongoing service—here, a voice call. In response to the request at block 137, the source eNB 122 may receive an indication from the target eNB 123 at block 138 that the target eNB 123 has admitted some but not all of the mandatory RABs. As discussed in the "Summary" section above, such partial admission of mandatory RABs would still result in a "successful" handover under existing HO procedures. However, according to particular embodiments of the present disclosure, instead of continuing with the HO as is currently being done, the source eNB 122 would prevent the HO of the UE to the target eNB 123 in response to receiving the indication from the target eNB 123 that it has partially admitted the mandatory RABs (block 139). Also, in one embodiment, two source eNB-based counters may be introduced to track failed admissions of ERABs during handovers for an ongoing voice call service. Thus, as noted at block 140, for the voice call service under discussion here, the source eNB 122 may increment a first counter for QCI 1 specific RAB(s) and/or a second counter for QCI 5 specific RAB(s) that failed to be admitted by the target eNB 123 at block 138. Additional discussion of these counters and the methodology in FIG. 8 is provided below with reference to exemplary embodiments in FIGS. 9-11. It is observed here that the QCI 1 (a GBR value) and QCI 5 (a non-GBR value) are listed as the first and the fifth entries, respectively, in the table 85 shown in FIG. 5.

Figure 9:
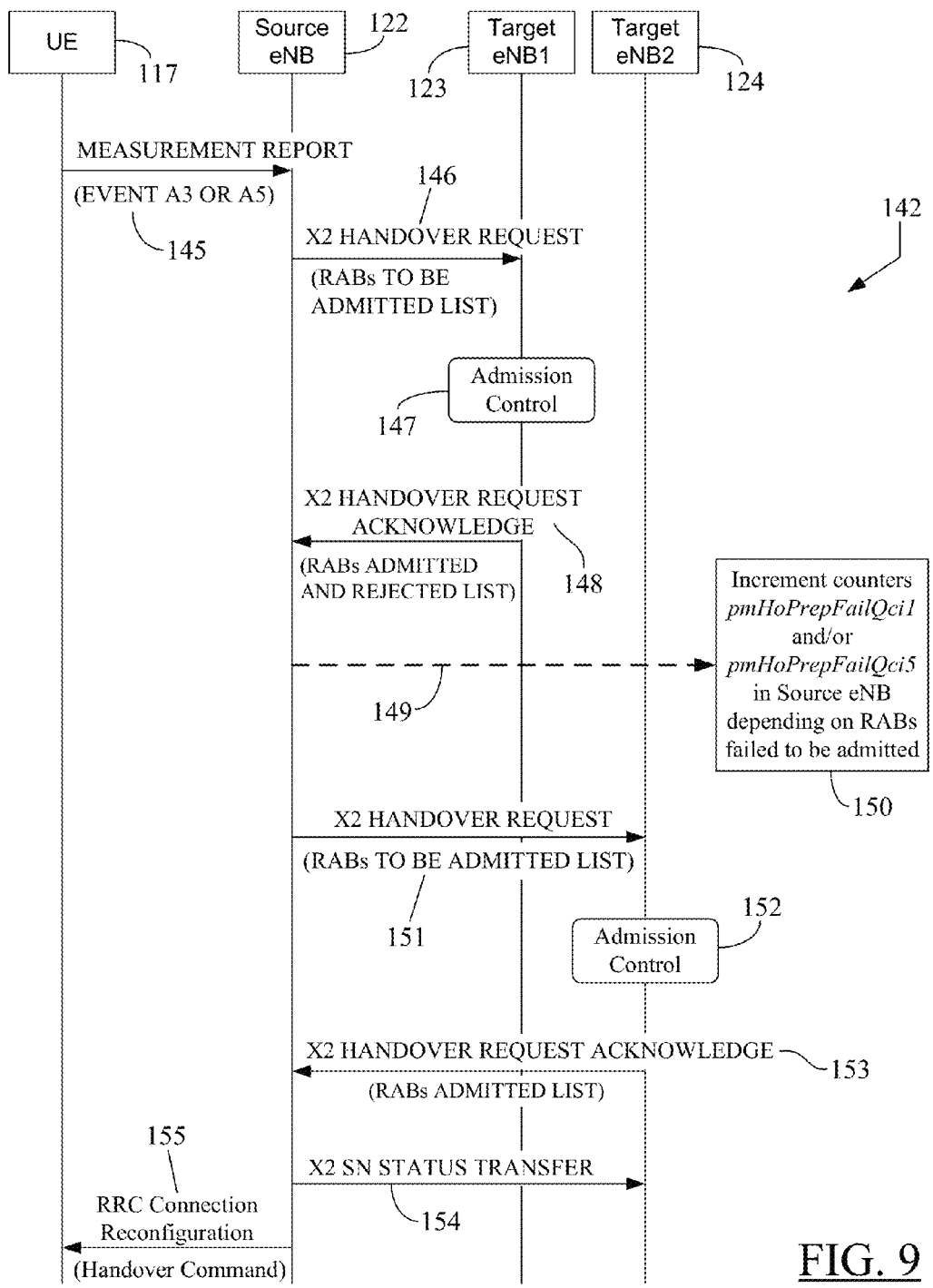
FIG. 9 depicts an exemplary call flow according to one embodiment of the present disclosure showing an intra-LTE handover scenario in which the HO is re-attempted to the second best cell in a UE's measurement report, and corresponding QCI-specific failure counters are incremented at the source eNB, when the first best cell in the UE's report fails to admit all mandatory RABs.
Figure 12:
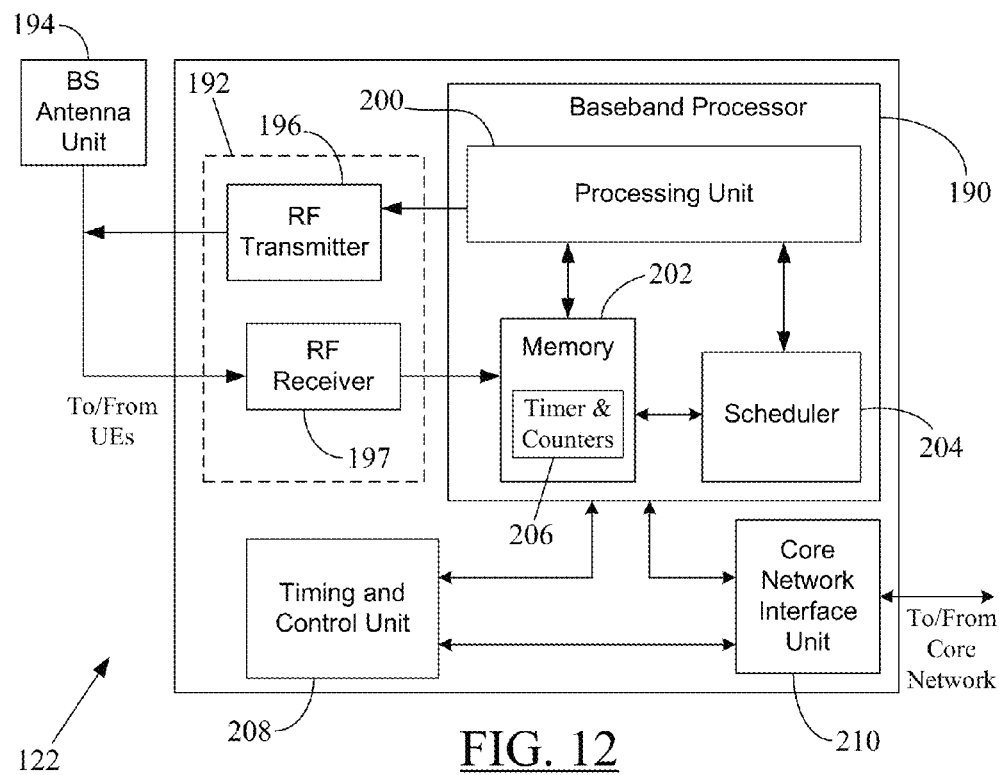
FIG. 12 depicts an exemplary block diagram of a serving base station that may be configured to sustain an ongoing service during HO according to the teachings of particular embodiments of the present disclosure.

FIG. 9 depicts an exemplary call flow 142 according to one embodiment of the present disclosure showing an intra-LTE handover scenario in which the HO is re-attempted to the second best cell in a UE's measurement report, and corresponding QCI-specific failure counters are incremented at the source eNB 122, when the first best cell in the UE's report fails to admit all mandatory RABs. In one embodiment, the QCI-specific counters may be implemented in the source eNB 122 in the form of a memory-based timer and counter unit 206 as shown in FIG. 12. Various entities shown in FIG. 9 are in the context of the wireless system 115 in FIG. 7 and, hence, the same reference numerals are used for those entities in FIGS. 7 and 9. In the discussion of FIG. 9, as an example, the potential target eNB 123 is treated as the "first best cell," whereas the potential target eNB 124 is treated as the "second best cell." The terms "first best cell" and "second best cell" may indicate the source eNB's 122 HO-related order of preference for potential target eNBs reported in the UE's measurement report. For example, the UE's measurement report to the source eNB 122 may indicate that the strength of the signals received by the UE 117 from the candidate eNB 123 are better than the signal strength of the signals from the candidate eNB 124. In that case, the source eNB 122 may prefer to first attempt the HO to the potential target eNB 123 and, if that HO is not materialized, then attempt another HO to the second preference eNB 124 as discussed below. In addition to the signal strengths, other factors may be used by the source eNB 122 to prioritize potential target eNBs for UE's handover. Such factors may include, for example, geographical proximity of the potential target cell, loading of the potential target cell, whether the reported potential target cell is a "blacklisted" cell to which handoff is not allowed, and the like.

Initially, at arrow 145, the UE 117 may provide a Measurement_Report message to its serving eNB. The operation at arrow 145 is similar to that shown at arrow 44 in FIG. 2 and, hence, is only briefly discussed herein. The Measurement Report at arrow 145 may report candidate eNBs 123-124 for intra-LTE handover. In the embodiment of FIG. 9, each of these candidate eNBs may satisfy criteria associated with an "A3" event, or an "A5" event, or both. As noted earlier, these A3, A5, and other "events" mentioned below are defined for E-UTRAN in section 5.5.4 of the earlier-mentioned 3GPP TS 36.331. Briefly, an "A3" event refers to a situation when the UE 117 is receiving signals from a target cell that are better than the signals from its serving cell 122 by a predefined offset. An "A5" event refers to a situation when the signals received by the UE 117 from the serving cell 122 become worse than a first predefined threshold, whereas the signals from a neighbor/target cell become better than a second pre-defined threshold. In event "A1," the signals from the serving cell become better than a pre-defined threshold; whereas in event "A2," the signals from the serving cell become worse than another pre-defined threshold. The event "B2" defines a situation when the signals from a UE's serving cell become worse than a first pre-defined threshold and signals from an inter-RAT neighbor cell (not shown in FIG. 7) become better than a second pre-defined threshold. The A1, A2, A5, and B2 events may be triggered for an SRVCC handover as discussed later with reference to FIG. 10. Various "events"—like A3 event, A5 event, B2 event, and so on—discussed herein are by way of examples only. The teachings of the present disclosure may apply to other non-mentioned events as well.

Based on the measurement report, the source eNB 122 may make a decision as to which target eNB 123 or 124 should be selected for UE's handover. Such decision operation may be similar to that noted at block 45 in FIG. 2. In the embodiment of FIG. 9, the source eNB 122 initially selects the first target eNB 123 for UE's handover. It is assumed in FIG. 9 that there are individual X2 interfaces established between the source eNB 122 and each of the potential target eNBs 123-124. Hence, at arrow 146, the source eNB 122 may send an X2 Handover Request message to the selected target eNB 123 with the list of mandatory ERABs to be admitted as part of supporting one or more QCIs associated with the currently-ongoing voice call service at the UE 117. For VoLTE call service, the QCIs may include, for example, QCI 1, QCI 5, QCI 8, and/or QCI 9. In response to the HO Request at arrow 146, the first target eNB 123 may perform admission control at block 147 for each ERAB individually. During the admission control phase, although not shown in FIG. 9, the source eNB 122 may also activate a timer similar to the timer 48 in FIG. 2. At arrow 148, the target eNB 123 may send the X2 Handover Request Acknowledge message to the source eNB 122. This Handover Acknowledge message may contain a list of admitted ERABs and rejected ERABs. It is observed here that the operations associated with reference numerals 146-148 may be similar to those associated with reference numerals 46-47 and 49, respectively, and, hence, earlier discussion of similar operations is not repeated herein for the sake of brevity.

Figure 2:
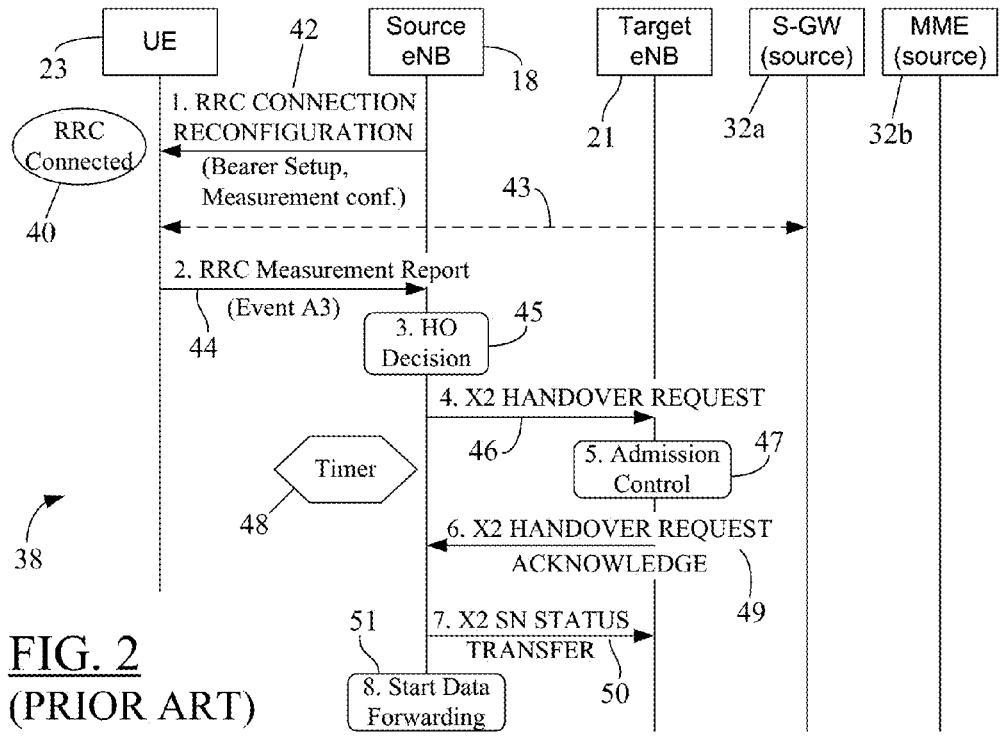
FIG. 2 shows an operational sequence for X2 handover in an LTE network.
Figure 3:
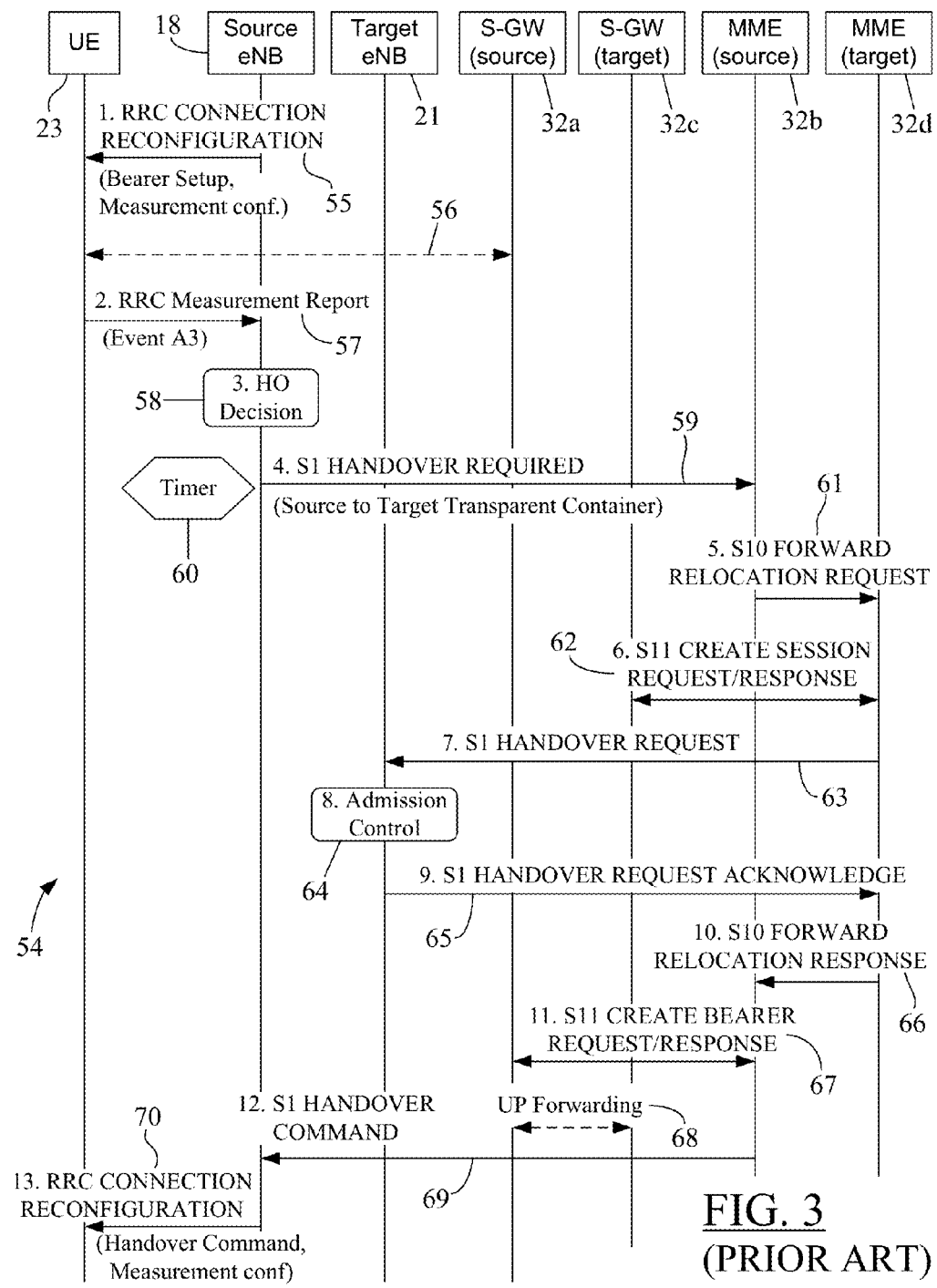
FIG. 3 shows an operational sequence for S1 handover in an LTE network.

If all the mandatory ERABs associated with the voice call service-specific QCIs are admitted by the target eNB 123, only then the source eNB 122 will continue with the normal HO procedure and initiate the HO using the X2 Handover procedure of FIG. 2 and/or the S1 Handover procedure of FIG. 3 discussed earlier. However, if the target eNB 123 fails to admit at least one of these mandatory ERABs, then the source eNB 122 will not proceed with the HO to this target eNB 123, as per teachings of particular embodiments of the present disclosure. In the embodiment of FIG. 9, the target eNB 123 is assumed to admit some, but not all of the manda-tory ERABs. Therefore, the source eNB 122 will not initiate handover of the UE to the target eNB 123. Rather, the source eNB 122 will attempt HO to the second best intra-LTE cell 124, as discussed later below.

In the exemplary embodiment of FIG. 9, two new source eNB-based performance-monitoring (pm) counters are introduced to track a target eNB's failure to admit ERABs with QCI 1 and QCI 5 at handover. Similar counters may be established for other QCIs as well. In FIG. 9, the first counter is referred to as "performance-monitoring of Handover Preparation Failure for QCI 1" counter or, simply, the "pmHoPrepFailQci1" counter; and the second counter is referred to as "pmHoPrepFailQci5" counter. Thus, as indicated by dotted arrow 149 and as described at block 150 in FIG. 9, the source eNB 122 may increment/increase the values of these counters in case any of the mandatory ERABs associated with QCI 1 and/or QCI 5 are not admitted in the Handover Request Acknowledge message 148 from the target eNB 123. These QCI-specific counters may be used for all potential target eNBs where one or more mandatory ERABs corresponding to the QCI at issue fail admissions during handovers. Also, as discussed later below with reference to FIG. 11, the source eNB 122 may initiate a user-definable timer to prevent subsequent HO attempts to the same target cell—here, the target cell 123—within a stipulated time based on the new UE Measurement Reports received/buffered at the source eNB 122. This timer may be referred to as a "timer for restricting Attempted Handover (to the same cell)" or, more simply, the "treAttHo" timer. In one embodiment, such treAttHo timer may be implemented in the source eNB 122 in the form of the earlier-mentioned memory-based timer and counter unit 206 as shown in FIG. 12.

Referring again to FIG. 9, according to particular embodiments of the present disclosure, when the first best target cell 123 fails to admit all mandatory ERABs, the source eNB 122 will attempt the intra-LTE handover to the second best target cell—here the target cell 124—which is reported in the UE's Measurement Report (at arrow 145) as satisfying the criteria for the events A3 or A5. Thus, as shown at arrow 151, the source eNB 122 may send an X2 HO Request to the new target eNB 124. The HO Request will contain the list of mandatory ERABs to be admitted as part of supporting one or more QCIs associated with the currently-ongoing voice call service at the UE 117. Upon performing admission control for each ERAB individually (block 152), the second target eNB 124 may send an indication to the source eNB 122 informing the source eNB 122 that the target eNB 124 has admitted all the ERABs listed in the HO Request at arrow 151. Such an indication may be in the form of an X2 HO Request Acknowledge message as shown at arrow 153. Because the second target eNB 124 has admitted all mandatory ERABs, the source eNB 122 will initiate the UE's 117 handover to the target eNB 124 as indicated by the X2 SN Status Transfer message at arrow 154 and the RRC Connection Reconfiguration message at arrow 155. The operations 151 through 154 are similar to the operations 46-47 and 49-50, respectively, in FIG. 2 and, hence, prior discussion of these operations is not repeated herein. Similarly, the operation at arrow 155 is similar to that at arrow 70 in FIG. 3 and, hence, is also not discussed in further detail here.

In FIG. 9, the second best cell 124 is shown to have admitted all mandatory ERABs. However, if that is not the case, then the source eNB 122 may not initiate an HO to the second target eNB 124, but may rather attempt an HO to the third best cell in the UE's measurement report received at arrow 145 or buffered earlier, as discussed later in the context of FIG. 11. Such process may be repeated until an intra-LTE target cell admits all ERABs or there are no more intra-LTE cells available to attempt handover based on the UE's measurement report. If there are no intra-LTE cells available to attempt handover, it may be preferable to trigger an early HO to a different RAT through the Single Radio Voice Call Continuity (SRVCC) Handover mechanism as discussed with reference to FIG. 10.

Figure 10:
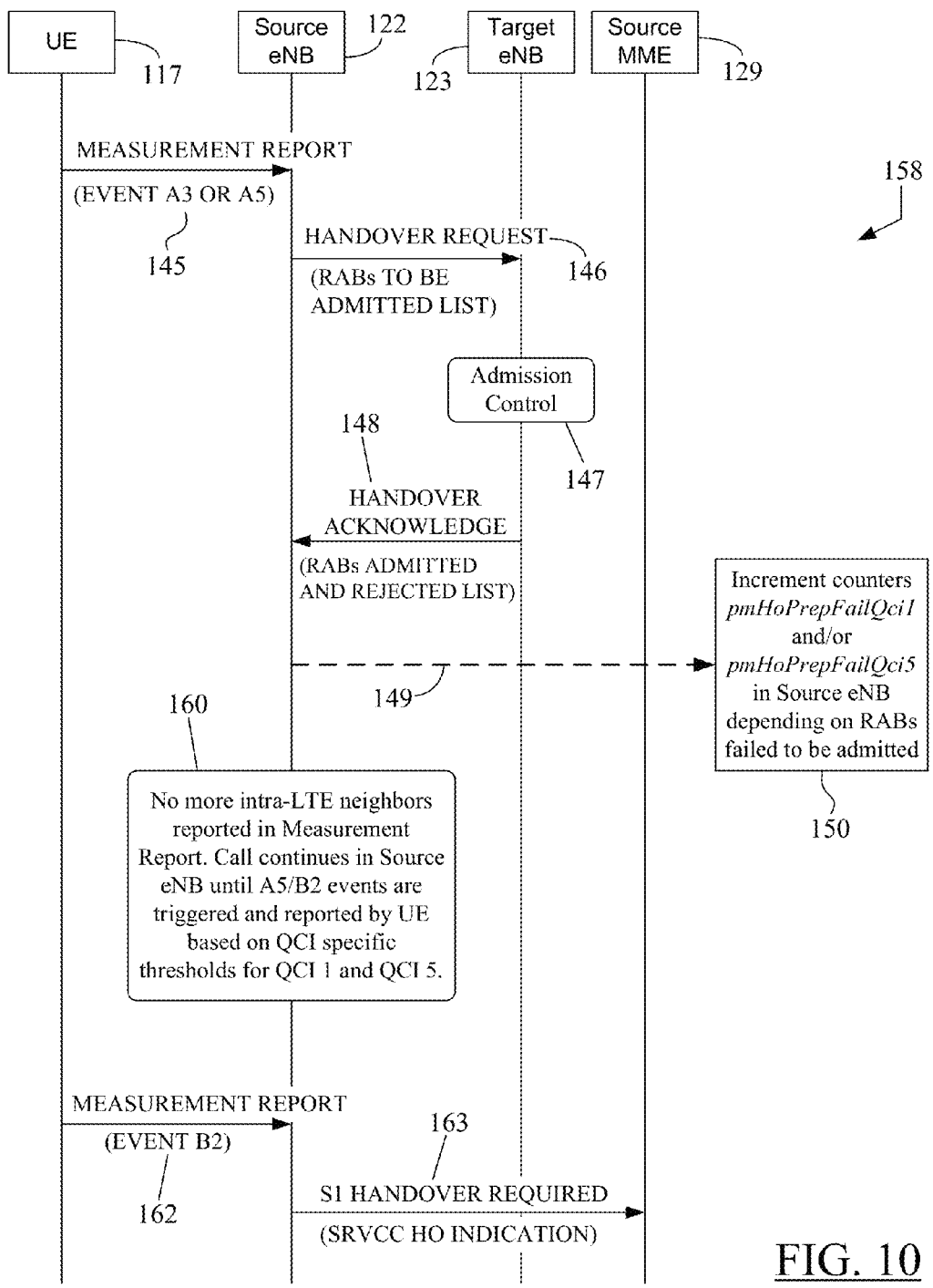
FIG. 10 shows an exemplary call flow according to one embodiment of the present disclosure depicting initiation of an SRVCC HO, which is triggered based on modified A1, A2, A5, or B2 thresholds for QCI 1 and QCI 5 when the first best cell in the UE's original A3 Measurement Report fails to admit all mandatory RABs and there is no second best cell in the original A3 Measurement Report from the UE 117.

Prior to discussing FIG. 10, a brief overview of the SRVCC procedure is provided. The SRVCC procedure is described in more detail in the 3GPP TS 23.216, version 12.1.0 (June 2014), titled "3rd Generation Partnership Project; Technical Specification Group Services and System Aspects; Single Radio Voice Call Continuity (SRVCC); Stage 2 (Release 12)." The SRVCC procedure relates to maintaining voice call continuity for a UE between IMS over Packet Switched (PS) access and Circuit Switched (CS) access for calls that are anchored in an IMS when the UE is capable of transmitting/receiving on only one of those access networks at a given time. The E-UTRAN access network discussed before with reference to FIG. 7 may provide the PS access for the UE 117 operating in the LTE carrier network 120. On the other hand, a UTRAN or GERAN network (not shown) may provide the CS access. The UTRAN network may provide the PS access as well. Here, the term "GERAN" refers to a GSM EDGE Radio Access Network. The SRVCC may be a "PS to CS SRVCC" such as, for example, SRVCC from EUTRAN to UTRAN/GERAN, or a "CS to PS SRVCC" such as, for example, SRVCC from UTRAN to E-UTRAN or from GERAN to UTRAN/E-UTRAN. Furthermore, the term "SRVCC," as used herein, may include the Single Radio Video Call Continuity (vSRVCC) procedure as well in particular embodiments.

FIG. 10 shows an exemplary call flow 158 according to one embodiment of the present disclosure depicting initiation of an SRVCC HO, which is triggered based on modified A1, A2, A5, or B2 thresholds for QCI 1 and QCI 5 when the first best cell in the UE's original A3/A5 Measurement Report fails to admit all mandatory RABs and there is no second best cell in the original A3/A5 Measurement Report from the UE 117. As in case of FIG. 9, the target eNB 123 is considered as the "first best cell" in case of FIG. 10 and, hence, no other target eNB is shown in FIG. 10. It is understood that although the second target eNB 124 may be part of the carrier network 120, the second eNB 124 may not satisfy requirements for the events A3 or A5 and, hence, may not appear on the A3/A5 Measurement Report sent by the UE 117 at arrow 145 in FIG. 10. In any event, for ease of discussion, the same reference numerals 145-150 are used in FIGS. 9-10 to refer to identical operations, even when the A3/A5 Measurement Reports from the UE 117 have different contents in the embodiments of FIGS. 9 and 10. These identical operations are therefore not discussed again with reference to FIG. 10 in view of their earlier discussion.

In the context of discussion of FIG. 10, it is assumed that the UE 117 is a UE that is enhanced for or capable of SRVCC and vSRVCC. It is further assumed that the source MME 129 and the CS-based target RAT (not shown) also support SRVCC. The UE 117 may include the SRVCC capability indication as part of the "UE Network Capability" in the initial Attach Request message (not shown) to the source eNB 122. The source MME 129 may store this information for future SRVCC operation.

As noted earlier, if there are no second best intra-LTE cells available in the UE's measurement report 145 to attempt handovers when the first best cell fails to admit all mandatory RABs, the source eNB 122 may be configured to trigger an early handover to a different RAT through the SRVCC HO mechanism. In one embodiment, to initiate an SRVCC HO, the threshold values for events A1, A2, A5, and B2 may be set differently for different QCIs for triggering A1, A2, A5, and B2 events using a Service Triggered Mobility (STM) feature in an LTE E-UTRAN system. For example, by setting different offsets for QCI 1 and QCI 5, early triggering of A1, A2, A5, and B2 can be done as explained below. This will give the source eNB 122 the possibility of handing over the PS-based voice bearer in E-UTRAN of the LTE carrier network 120 to a CS bearer in a UTRAN/GERAN network (not shown), thereby retaining the speech quality and, hence, the ongoing voice call service.

The STM feature may enable coverage-triggered mobility based on QoS. In that regard, using the STM feature, the source eNB 122 may apply dynamic levels of coverage thresholds to the UE 117 based on QCI profiles of the bearers. Each QCI profile may hold offsets of the thresholds for events A1, A2, A5, and B2. These offsets may be user-settable through system parameters. For SRVCC HO, in one embodiment, the source eNB 122 may reconfigure the threshold levels for the A1, A2, A5, and B2 events in the UE 117 based on the changing bearer QCI profile constellation. A bearer QCI profile constellation can change due to bearer set up, release, or modification procedures. In the STM approach, each event-specific threshold configured by a source eNB in a UE—such as the UE 117—at a particular time may be based on the highest of the offsets found in the QCI profiles of all bearers. This implies that a UE—such as the UE 117—requiring high signal quality will report poor coverage earlier than another UE that has been assigned bearers not requiring as high signal quality. In this manner, early triggering of A1, A2, A5, and B2 events can be done at the UE 117. The events A1, A2, and B2 are used herein as examples of the events supporting inter-RAT handovers.

Referring back to FIG. 10, as noted at block 160, when no more intra-LTE neighbors are reported in the UE's measurement report at arrow 145, the ongoing voice call session may continue in the source eNB 122 until an inter-RAT HO event such as, for example, an A2 or a B2 event, is triggered and reported by the UE 117 based on the "revised" QCI-specific thresholds, for example, for QCI 1 and QCI 5. Such "revised" or "reconfigured" thresholds may be accomplished using the STM feature discussed above. In the embodiment of FIG. 10, the UE 117 may send a Measurement Report at arrow 162, reporting a B2 event. The B2 event is used as an example only. Other inter-RAT HO-supporting events, such as events A1 or A2, may be similarly reported as well. The UE's measurement report may identify an inter-RAT neighbor cell (not shown) which supports the HO using the SRVCC procedure and satisfies the signal quality threshold conditions of the reported B2 event. In E-UTRAN, when a target cell is selected for SRVCC handover, the source eNB 122 may send an indication to the source MME 129 that this HO procedure requires SRVCC. Hence, as shown at arrow 163, to initiate the SRVCC HO to this inter-RAT target cell (not shown), the S1 HO Required message from the source eNB 122 to the source MME 129 includes an SRVCC HO indication.

Figure 11A:
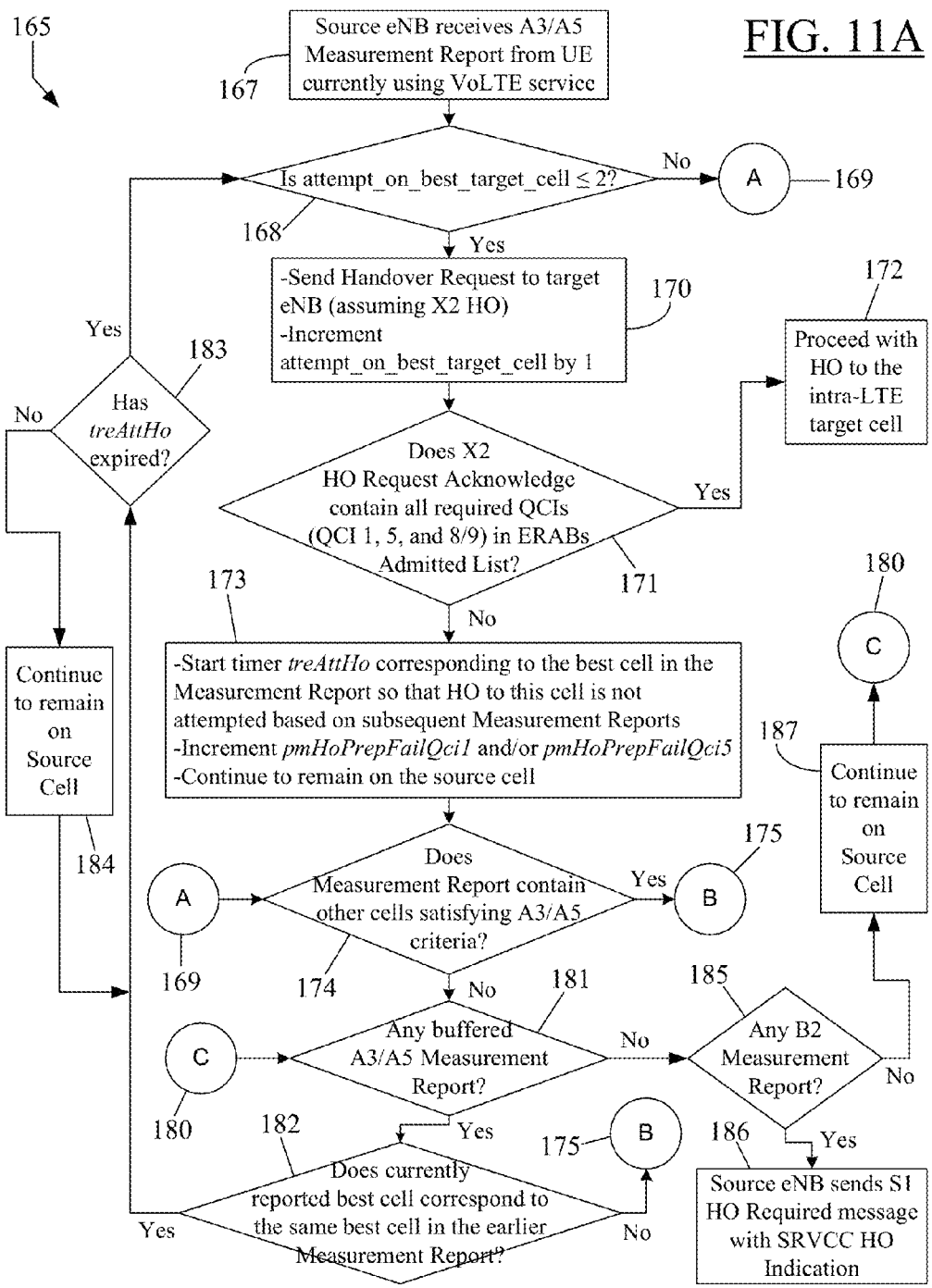
FIGS. 11A and 11B (collectively "FIG. 11") illustrate an exemplary flowchart depicting details of how a network entity may perform the service-retaining handover for VoLTE calls in a cellular network according to particular embodiments of the present disclosure.
Figure 11B:
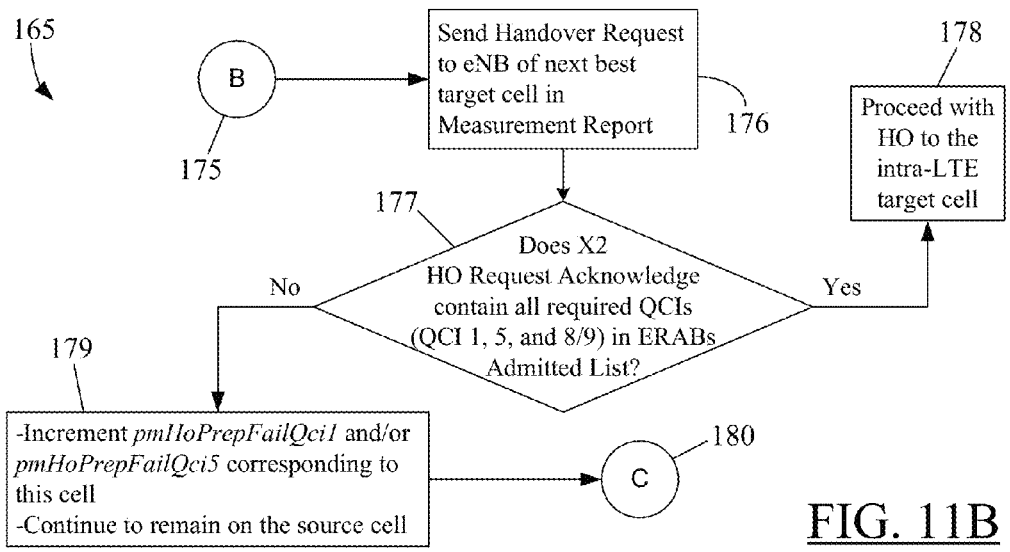

FIGS. 11A and 11B (collectively "FIG. 11") illustrate an exemplary flowchart 165 depicting details of how a network entity, such as, for example, the source eNB 122 in FIG. 7, may perform the service-retaining handover for VoLTE calls in a cellular network, such as, for example, the carrier network 120 in FIG. 7, according to particular embodiments of the present disclosure. The HO approach illustrated in FIG. 11 also may be used for services other than the VoLTE call service. The flowchart 165 in FIG. 11 will be described with reference to the message flows shown in FIGS. 9-10 and with reference to the wireless system 115 shown in FIG. 7 to provide proper context of discussion.

Referring now to FIG. 11A, initially at block 167, the source eNB 122 may receive an A3 and/or A5 Measurement Report from the UE 117 that is currently using the VoLTE service being provided to the UE 117 through the source eNB 122 in the network 120. The receipt of such measurement report is indicated at arrow 145 in FIGS. 9-10. After receipt of the report at block 167, the source eNB 122 may determine, at decision block 168, whether a counter—which is referred to herein as the "attempt_on_best_target_cell" counter—at the source eNB 122 has a value that is less than or equal to a predetermined number. The source eNB 122 may use this counter to monitor its attempts to HO the UE 117 to the same first best target cell reported in the UE's measurement report. Here, the target eNB 123 is treated as the "first best target cell" as noted before. In the embodiment of FIG. 11A, the predetermined number is "2" (two). Hence, in that embodiment, the source eNB 122 can attempt the HO a maximum of two times to the same target eNB 123, unless additional timer requirements are satisfied as discussed later below. If the HO is already attempted twice to the same target eNB 123, the flow proceeds to the operations starting at the circled letter "A," which is identified by reference numeral "169" and discussed later below.

If the source eNB's 122 HO attempt satisfies the counter limit at block 168, the source eNB 122 may send an X2 HO Request to the target eNB 123 as shown at arrow 146 in FIGS. 9-10. The request may contain a list of mandatory ERABs to be admitted by the target cell 123. Here, an X2 HO is assumed. The source eNB 122 may also increment the attempt_on_best_target_cell counter by "1". These two operations are noted at block 170. When the source eNB 122 receives an X2 HO Request Acknowledge message from the target eNB 123, the source eNB 122 may determine at decision block 171 whether the acknowledge message contains all required QCIs for VoLTE service—such as, for example, QCI 1, 5, 8, and/or 9—in the list of admitted ERABs. In other words, the source eNB 122 may determine whether the target eNB 123 has admitted all mandatory ERABs sent in the HO Request at block 170. The HO Request Acknowledge message is shown at arrow 148 in FIGS. 9-10. If all mandatory ERABs are admitted by the target eNB 123, then the source eNB 122 may proceed with the HO to this intra-LTE target cell 123, as noted at block 172. However, if at least one of the mandatory ERABs is not admitted by the target eNB 123, then the source eNB 122 may not initiate the HO to the target eNB 123 as per teachings of particular embodiments of the present disclosure. Instead, the source eNB 122 may perform the following steps noted at block 173 in FIG. 11A: (i) Start the "treAttHo" timer (mentioned earlier) corresponding to the first best cell—here, the target eNB 123—in the UE's measurement report (at block 167) so that HO to this best cell is not again attempted based on subsequent Measurement Report(s) from the UE unless the timer has expired and the attempt counter limit at block 168 is satisfied, as discussed below. (ii) Increment the "pmHoPrepFailQci1" and/or "pmHoPrepFailQci5" counters as noted at block 150 in FIGS. 9-10. (iii) Instruct the UE 117 to continue to remain on the source cell 122 until the next HO attempt.

If the HO attempts to the first best target cell have reached the pre-determined number at block 168, the source eNB 122 may reach the decision block 174 through the circled letter "A" having reference numeral "169." Alternatively, the source eNB 122 may also reach the decision block 174 upon concluding the steps at block 173. At the decision block 174, the source eNB may check whether the UE's measurement report (at block 167) contains other second best cell(s) satisfying the A3/A5 criteria for HO. If there is at least one such second best cell present in the UE's report, the operation flow in FIG. 11A may proceed to the operations starting at the circled letter "B", which is identified by reference numeral "175." As noted earlier, in the present discussion, the second target eNB 124 in FIG. 7 is treated as such "second best cell."

Referring now to FIG. 11B, through the circled letter "B" 175, the source eNB 122 may reach the block 176, where the source eNB 122 may send another X2 HO Request—now to the second best eNB 124. If this second best eNB 124 admits all the mandatory ERABs listed in the request at block 176, the source eNB 122 may proceed with the HO to this second best intra-LTE cell 124 as indicated through the sequence of blocks 177 and 178. However, like the first best cell 123, if the second best cell 124 also fails to admit at least one of the mandatory ERABs, the source eNB 122 may increment the "pmHoPrepFailQci1" and/or "pmHoPrepFailQci5" counters corresponding to this second best cell and may also instruct the UE 117 to continue to remain on the source cell 122 until the next HO attempt, as indicated through the sequence of blocks 177 and 179. Thus, in one embodiment, the source eNB 122 may maintain "pmHoPrepFailQci1" and/or "pmHoPrepFailQci5" counters for each potential target cell failing to admit all mandatory ERABs during, for example, an intra-LTE handover. From block 179, the process flow may lead to the operations starting at the circled letter "C", which is identified by reference numeral "180."

Referring again to FIG. 11A, if there are no second best cells satisfying A3/A5 criteria (block 174) or if the second best cell 124 admits some but not all of the mandatory ERABs (leading to circled letter "C" 180), then the source eNB 122 may reach the decision block 181. At block 181, the source eNB 122 may check whether there is any buffered (earlier-sent) A3/A5 Measurement Report stored at the source eNB 122 that indicates other possible best cell(s) for intra-LTE HO of the UE 117. If there is an earlier measurement report buffered at the source eNB 122, then, at decision block 182, the source eNB 122 may determine whether the new measurement report at block 167 contains the earlier-reported best cell as the new best cell. If the current and the previous measurement reports both list the target eNB 123 as the first best cell, then the source eNB 122 may check whether the guard timer "treAttHo" has expired (at decision block 183) and whether the number of HO retries on this target cell 123 has not exceeded two times (at decision block 168). If the outcome of these checks is positive, then the source eNB 122 may re-attempt the HO on the first target cell 123 (block 170). Else, the VoLTE call may continue on the source cell until the "treAttHo" timer expires (block 184). Also, the source eNB 122 may then wait for new A2, A3, A5, or B2 Measurement Reports.

In the embodiment of FIG. 11A, if the buffered measurement report has a different best cell listed therein, the process flow starting at the circled letter "B" 175 and shown in FIG. 11B may be performed as indicated at decision block 182. In one embodiment, the best cell listed in the buffered report may be the second target cell 124 or may be a third target cell (not shown) that is different from both the first target cell 123 and the second target cell 124. In any event, if the best cell in the buffered report also fails to admit all mandatory ERABs, the process flow may return to the decision block 181 upon reaching the circled letter "C" 180 in FIG. 11B.

The decision at block 181 is in the negative when there is no buffered A3/A5 Measurement Report or, if there is a buffered report, then the best cell in that report fails to admit all mandatory ERABs and leads the process to the circled letter "C" 180. Upon negative outcome at the block 181, the source eNB 122 may check at block 185 whether there is any B2 Measurement Report received from the UE 117 that lists an inter-RAT target eNB (not shown) for SRVCC HO. This aspect is noted at block 160 in FIG. 10, where receipt of a B2 report is shown at arrow 162. As before, the B2 event is used as an example here for the SRVCC HO related discussion. Other triggering events like A1 or A2 may be suitably used for inter-RAT HO through SRVCC. If there is a B2 Measurement Report available, then the source eNB 122 may send an S1 HO Required message with SRVCC HO Indication, as noted at block 186 and shown by the messaging at arrow 163 in FIG. 10. The source eNB 122 may then continue with the SRVCC HO procedure as discussed earlier. However, if there is no B2 measurement report received at block 185, the source eNB 122 may instruct the UE 117 to continue to remain on the source cell (block 187) and the flow may proceed to the circled letter "C" 180 as shown in FIG. 11A.

It is observed from the flowchart 165 in FIG. 11 that if the source eNB 122 does not proceed with an HO despite iterations through operations starting at circled letters "A", "B", and/or "C," then the source eNB 122 may continue to instruct the UE 117 to remain on the source cell unless attachment to the source cell is no longer possible such as, for example, when the signals received at the UE 117 from the source eNB 122 are so weak that the UE 117 may no longer sustain VoLTE call through the source cell. In that case, the ongoing VoLTE call may terminate and the UE 117 may initiate attachment to another serving cell (not shown). Thus, when different HO conditions fail such as, for example, failure of intra-LTE HO preparation, lack of intra-LTE or inter-LTE candidate cells in the buffered measurement report(s), or lack of inter-RAT neighbors to perform SRVCC, or unsuccessful SRVCC despite initiation thereof, the source eNB 122 may continue to serve the UE 117 unless attachment to the source cell is no longer possible for the UE 117.

Because the serving cell prevents HO when all mandatory ERABs necessary to support one or more QCIs associated with a VoLTE call service are not admitted by a potential target cell, the method illustrated in the flowchart 165 in FIG. 11 may increase the retainability of VoLTE calls while maintaining the integrity of voice call quality to the maximum. As noted before, a similar approach may be used for other services as well. Furthermore, in the embodiment of FIG. 11, because the source eNB 122 may maintain "pmHoPrepFailQci1" and/or "pmHoPrepFailQci5" counters for each potential target cell failing to admit all mandatory ERABs during an intra-LTE HO, such counters may serve as diagnostic tools to enable the network operator's support system (not shown) or maintenance personnel to track target cells causing failure of particular ERABs and then remedy the situation as needed.

FIG. 12 depicts an exemplary block diagram of a serving base station such as, for example, the source eNB 122 in FIG. 7, that may be configured to sustain an ongoing service during HO according to the teachings of particular embodiments of the present disclosure. In one embodiment, the eNB 122 may be configured to perform various source eNB-based functionalities discussed earlier with reference to FIGS. 8-11. Thus, for example, the eNB 122 may be configured to receive a measurement report from a UE, send an HO request to a potential target cell listed in the measurement report, monitor whether all mandatory RABs are admitted by a potential target cell, increment appropriate QCI-specific counters when a target cell fails to admit corresponding RAB, prevent HO of the UE when the target cell fails to admit all mandatory RABs, and so on. In that regard, the eNB 122 may include a baseband processor 190 to provide radio interface with the wireless devices/UEs such as, for example, the UE 117 or other mobile devices operating in the carrier network 120. Such radio interface may be provided via eNB's RF transceiver unit 192, which may be coupled to the processor 190 and to the eNB's antenna unit 194. The transceiver unit 192 may include RF transmitter 196 and RF receiver 197 units coupled to the eNB's antenna unit 194.

In one embodiment, the processor 190 may receive transmissions such as, for example, Uplink (UL) signals, neighboring cell measurement reports, and the like, from the UEs such as, for example, the UE 117 in FIG. 7, via the combination of the antenna unit 194 and the receiver 197. On the other hand, the eNB's transmissions such as, for example, scheduling instructions, handover information, and the like, to the UEs, such as the UE 117 in FIG. 7, may be carried out via the combination of the antenna unit 194 and the transmitter 196.

The processor 190 may be configured (in hardware and/or software) to perform various source eNB-related operations per the teachings of the present disclosure. In that regard, the processor 190 may include a processing unit 200 to perform HO assessment as per the teachings of the present disclosure to sustain an ongoing voice call or other service during the HO. The processing unit 200 may operate in conjunction with the RF transmitter 196, the RF receiver 197, the antenna unit 194, a memory unit 202, and a scheduler 204 (discussed later below) to accomplish various tasks discussed herein. In one embodiment, the memory 202 may be part of the processor 190 as shown. The memory 202 may store the necessary program code, which, when executed by the processing unit 200, may cause the eNB 122 to perform various source eNB-related operations discussed earlier with reference to FIGS. 9-11. In particular embodiments, the memory 202 may also include a Timer and Counter Unit (TCU) 206 that implements the "treAttHo" timer, and the "pmHoPrepFailQci1," "pmHoPrepFailQci5," and the "attempt_on_best_target_cell" counters discussed earlier with reference to FIG. 11. Other non-memory based implementations of one or more of these timer and counters may be devised as well.

The processing unit 200 may be in communication with the memory 202 to process and store relevant information for the source cell such as, for example, the identities of the UEs operating within the source cell, a neighbor list for the source cell, neighbor cell measurement reports received from UEs, and so on. A scheduler such as, for example, the scheduler 204, may be part of the eNB's 122 processor 190 and may provide the scheduling decisions for eNB-attached UEs based on a number of factors such as, for example, QoS (Quality of Service) parameters, UE buffer status, uplink channel feedback report received from UEs, UE capabilities, and the like. The scheduler 204 may have the same data structure as a typical scheduler in an eNB in an LTE system. In one embodiment, the eNB 122 may include separate UL and DL schedulers (not shown in FIG. 12) as part of its baseband processor 190. The processor 190 may also provide additional baseband signal processing as required. Such signal processing may include, for example, mobile device registration, channel signal information transmission, radio resource management, and so on.

The eNB 122 may further include a timing and control unit 208 and a core network interface unit 210 as illustrated in FIG. 12. The control unit 208 may monitor operations of the processor 190 and the network interface unit 210, and may provide appropriate timing and control signals to these units. The interface unit 210 may provide a bi-directional interface for the eNB 122 to communicate with its core network such as, for example, the CN 128 in FIG. 7, to facilitate administrative and call-management functions for mobile subscribers operating in the corresponding carrier network such as, for example, the carrier network 120 in FIG. 7, and attached to the eNB 122.

Some or all of the functionalities described above with reference to FIGS. 8-11 as being provided by a base station or another network entity having similar functionality may be provided by the processing unit 200 executing instructions stored on a computer-readable data storage medium, such as the memory 202 shown in FIG. 12.

It will be appreciated that various operations shown in FIGS. 8-11 may be substantially performed by a processor such as, for example, the processing unit 200 in FIG. 12. The processor may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. The processor may also employ distributed processing in certain embodiments.

Some or all aspects of the methodology provided herein (related to intelligent assessment of an HO to sustain an ongoing service) may be implemented in a computer program, software, firmware, or microcode incorporated in a non-transitory, computer-readable storage medium such as, for example, the memory 202 in FIG. 12, for execution by a general purpose computer or a processor such as, for example, the processing unit 200 in FIG. 12. In particular embodiments, such computer-readable medium may be part of a processor's internal memory such as, for example, the internal memory (not shown) of the processing unit 200 in FIG. 12. A processor, such as the processing unit 200 in FIG. 12, may execute instructions stored on a related computer-readable medium to carry out the software-based processing. Examples of computer-readable storage media include a Read Only Memory (ROM), a Random Access Memory (RAM), a digital register, a cache memory, a cloud-based storage system, semiconductor memory devices, magnetic media such as internal hard disks, magnetic tapes and removable disks, magneto-optical media, and optical media such as CD-ROM disks and Digital Versatile Disks (DVDs).

Alternative embodiments of the base station 122 may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features and elements. As mentioned before, the functions of the eNB 122 may be provided through the use of hardware (such as circuit hardware) and/or hardware capable of executing software/firmware in the form of coded instructions or microcode stored on a computer-readable medium (mentioned above). Thus, such functions and illustrated functional blocks in FIGS. 8-11 are to be understood as being either hardware-implemented and/or computer-implemented, and thus machine-implemented.

The foregoing describes a system and method to sustain an on-going VoLTE service, or any other service, at a UE during handovers. To accomplish this objective, the source eNB may prevent HO to the best cell reported in a Measurement Report from the UE if the best cell fails to admit all the mandatory RABs as part of supporting one or more QCIs associated with the service being provided to the UE. Rather, the source eNB may attempt the HO to the next best cell in the UE's Report. For a voice call, if the next best cell also fails to admit all the mandatory RABs and if there are no other intra-LTE cells reported in the UE's Measurement Report, then the source cell may perform an inter-RAT HO using the SRVCC procedure. If there is no intra-LTE or inter-RAT HO possible due to, for example, lack of candidate intra-LTE or inter-LTE cells in the buffered measurement reports or lack of inter-RAT neighbors to perform SRVCC, the source eNB may continue to serve the UE. By preventing successful, but "partial" handovers when all mandatory RABs for associated QCIs are not admitted by the target cell, the retainability of VoLTE calls or other services during HO is significantly improved. The user of a UE can thus receive uninterrupted delivery of a currently on-going service during a handover. New counters at the source cell may enable the network operator to track (target) cells causing failure of particular RABs.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of sustaining an ongoing service when a User Equipment (UE) is to be handed over to a target evolved Node B (eNB) by a source eNB in a wireless system, wherein the service is being provided to the UE through the source eNB, and wherein the method comprises performing the following using the source eNB:

receiving, from the UE, a list of potential target eNBs for handover of the UE;

sending a first request to a first target eNB in the list for the handover of the UE, wherein the first request includes all mandatory Radio Access Bearers (RABs) to be admitted by the first target eNB as part of supporting one or more Quality of Service Class Identifiers (QCIs) associated with the service;

receiving a first indication from the first target eNB that the first target eNB has admitted some but not all of the mandatory RABs; and preventing the handover of the UE to the first target eNB in response to receiving the first indication from the first target eNB.

2. The method of claim 1, further comprising performing the following using the source eNB:

establishing at least one QCI-specific counter at the source eNB; and incrementing the at least one QCI-specific counter every time a mandatory RAB associated with a corresponding QCI fails to be admitted by a potential target eNB in the list as part of the handover of the UE.

3. The method of claim 1, wherein the method comprises further performing the following using the source eNB:

sending a second request to a second target eNB in the list for the handover of the UE, wherein the second request includes all the mandatory RABs to be admitted by the second target eNB as part of supporting the one or more QCIs associated with the service;

receiving a second indication from the second target eNB that the second target eNB has admitted all the mandatory RABs; and initiating the handover of the UE to the second target eNB in response to receiving the second indication from the second target eNB.

4. The method of claim 3, wherein the wireless system is an Evolved Universal Terrestrial Radio Access Network (E-UTRAN) based system, and wherein each of the first and the second target eNBs in the list satisfies criteria associated with either an A3 event or an A5 event defined for E-UTRAN.

5. The method of claim 1, wherein the service is a voice call.

6. The method of claim 5, wherein the wireless system is an Evolved Universal Terrestrial Radio Access Network (E-UTRAN), and wherein the method comprises further performing the following using the source eNB:
receiving, from the UE, a measurement report that identifies an inter-Radio Access Technology (RAT) neighbor cell which supports the handover of the UE using a Single Radio Voice Call Continuity (SRVCC) procedure;
determining that one of the following conditions is satisfied:
the list contains only the first target eNB as a potential target eNB that satisfies criteria associated with either an A3 event or an A5 event defined for E-UTRAN, and there is no source eNB-based buffered report from the UE which identifies one or more potential target eNBs that satisfy the criteria associated with either the A3 event or the A5 event,
the first target eNB and a second target eNB in the list both fail to admit at least one of the mandatory RABs, and there is no source eNB-based buffered report from the UE which identifies one or more potential target eNBs that satisfy the criteria associated with either the A3 event or the A5 event, or
there is a single buffered report from the UE at the source eNB which identifies one or more potential target eNBs that satisfy criteria associated with either the A3 event or the A5 event, and the first target eNB in the list and a third target eNB in the single buffered report both fail to admit at least one of the mandatory RABs; and
in response to the determination, initiating the handover of the UE to the inter-RAT neighbor cell using the SRVCC procedure.

7. The method of claim 6, wherein the initiating the handover of the UE includes further performing the following using the source eNB:
sending a message with SRVCC handover indication to a management entity in a core network associated with the source eNB in the wireless system.

8. The method of claim 7, wherein the message is an S1 Handover Required message, and wherein the management entity is a Mobility Management Entity (MME).

9. The method of claim 6, wherein the inter-RAT neighbor cell satisfies criteria associated with a B2 event defined for E-UTRAN.

10. The method of claim 6, further comprising performing the following using the source eNB:
continuing to serve the UE if the handover to the inter-RAT neighbor cell fails using the SRVCC procedure.

11. The method of claim 1, wherein the sending the first request to the first target eNB includes performing the following using the source eNB:
first determining that a counter at the source eNB has a value that is less than or equal to a pre-determined number; and
sending the first request to the first target eNB in response to the first determination.

12. The method of claim 11, wherein the pre-determined number is "2".

13. The method of claim 11, wherein the method comprises further performing the following using the source eNB:
incrementing the value of the counter by "1";
starting a timer at the source eNB;
second determining that at least the following two conditions are satisfied:
the timer has expired, and
the incremented value of the counter is less than or equal to the pre-determined number; and
re-sending the first request to the first target eNB in response to the second determination.

14. The method of claim 13, wherein the wireless system is an Evolved Universal Terrestrial Radio Access Network (E-UTRAN), and wherein the second determining includes further performing the following using the source eNB:
third determining that one of the following conditions is satisfied:
the list contains only the first target eNB as a potential target eNB that satisfies criteria associated with either an A3 event or an A5 event defined for E-UTRAN, and a source eNB-based buffered report from the UE identifies the first target eNB as the best potential target eNB that satisfies the criteria associated with either the A3 event or the A5 event; or
a second target eNB in the list also fails to admit at least one of the mandatory RABs, and the source eNB-based buffered report from the UE identifies the first target eNB as the best potential target eNB that satisfies the criteria associated with either the A3 event or the A5 event.

15. A network entity in a cellular network for sustaining an ongoing service when a mobile device associated with a serving cell is to be handed over by the network entity, wherein the network entity comprises:
a transceiver for wirelessly communicating with the mobile device and for facilitating provision of the service to the mobile device in the serving cell;
a memory for storing program instructions; and
a processor coupled to the memory and the transceiver and configured to execute the program instructions, which, when executed by the processor, cause the network entity to perform the following:
receive, from the mobile device, a list of potential target entities for handover of the mobile device;
send a request to a target entity in the list for the handover of the mobile device, wherein the request includes all mandatory Radio Access Bearers (RABs) to be admitted by the target entity as part of supporting one or more Quality of Service Class Identifiers (QCIs) associated with the service; and
perform the handover of the mobile device to the target entity only if the target entity sends a response to the request that indicates that the target entity has admitted all of the mandatory RABs.

16. The network entity of claim 15, wherein the network entity is one of:
a Radio Base Station (RBS);
a Base Station Controller (BSC);
a Radio Network Controller (RNC); and
an evolved Node B (eNodeB).

17. The network entity of claim 15, wherein the program instructions, when executed by the processor, cause the network entity to further perform the following:
establish at least one QCI-specific counter at the network entity; and
increment the at least one QCI-specific counter every time a mandatory RAB associated with a corresponding QCI fails to be admitted by a potential target entity in the list as part of the handover of the mobile device.

18. The network entity of claim 15, wherein the program instructions, when executed by the processor, cause the network entity to further perform the following as part of sending the request to the target entity:
determine that a counter at the network entity has a value that is less than or equal to a pre-determined number; and
send the request to the target entity in response to the determination.

19. The network entity of claim 15, wherein the program instructions, when executed by the processor, cause the network entity to further perform the following when the response indicates that the target entity has failed to admit at least one of the mandatory RABs:
receive, from the mobile device, a measurement report that identifies an inter-Radio Access Technology (RAT) neighbor cell which supports the handover of the mobile device using a Single Radio Voice Call Continuity (SRVCC) procedure; and
initiate the handover of the mobile device to the inter-RAT neighbor cell using the SRVCC procedure.

20. A wireless system comprising:
a source evolved Node B (eNB) that is configured to perform the following as part of sustaining an ongoing service when a User Equipment (UE) is to be handed over by the source eNB:
facilitate provision of the service to the UE in a serving cell associated with the source eNB,
receive, from the UE, a list of potential target eNBs for handover of the UE,
determine that an attempt counter at the source eNB has a value that is less than or equal to a pre-determined number,
in response to the determination, send a first request to a first target eNB in the list for the handover of the UE, wherein the first request includes all mandatory Radio Access Bearers (RABs) to be admitted by the first target eNB as part of supporting one or more Quality of Service Class Identifiers (QCIs) associated with the service,
receive a first indication from the first target eNB that the first target eNB has admitted some but not all of the mandatory RABs, and
prevent the handover of the UE to the first target eNB in response to receiving the first indication from the first target eNB; and
the first target eNB that is in communication with the source eNB and configured to perform the following:
receive the first request from the source eNB,
perform first target eNB-specific admission control for the mandatory RABs based on first target eNB-specific available radio resources, and
send the first indication to the source eNB based on the result of the first target eNB-specific admission control.

21. The wireless system of claim 20, wherein the source eNB is configured to further perform the following:
establish at least one QCI-specific counter at the source eNB; and
increment the at least one QCI-specific counter every time a mandatory RAB associated with a corresponding QCI fails to be admitted by a potential target eNB in the list as part of the handover of the UE.

22. The wireless system of claim 20, wherein the source eNB is configured to further perform the following:
send a second request to a second target eNB in the list for the handover of the UE, wherein the second request includes all the mandatory RABs to be admitted by the second target eNB as part of supporting the one or more QCIs associated with the service,
receive a second indication from the second target eNB that the second target eNB has admitted all the mandatory RABs,
initiate the handover of the UE to the second target eNB in response to receiving the second indication from the second target eNB; and
wherein the wireless system further comprises the second target eNB that is in communication with the source eNB and configured to perform the following:
receive the second request from the source eNB,
perform second target eNB-specific admission control for the mandatory RABs based on second target eNB-specific available radio resources, and
send the second indication to the source eNB based on the result of the second target eNB-specific admission control.

\* \* \* \* \*

UNITED STATES PATENT AND TRADEMARK OFFICE
CERTIFICATE OF CORRECTION

PATENT NO.      : 9,253,704 B1
APPLICATION NO. : 14/496422
DATED           : February 2, 2016
INVENTOR(S)     : Sarkar et al.

Page 1 of 1

It is certified that error appears in the above-identified patent and that said Letters Patent is hereby corrected as shown below:

In Column 4, Line 12, delete "target cell 21" and insert -- target cell 20 --, therefor.

In Column 8, Line 46, delete "Transparent Mode$^{TM,}$" and insert -- Transparent Mode (TM), --, therefor.

In Column 8, Line 51, delete "RLC$^{TM,}$" and insert -- RLC TM --, therefor.

In Column 15, Line 59, delete "iPhone$^{TM,}$" and insert -- iPhone$^{TM}$, --, therefor.

In Column 21, Line 11, delete "serving cell 122" and insert -- serving cell 17 --, therefor.

In Column 21, Line 13, delete "serving cell 122" and insert -- serving cell 17 --, therefor.

Signed and Sealed this
Third Day of May, 2016

Michelle K. Lee
*Director of the United States Patent and Trademark Office*